(12) United States Patent
Back et al.

(10) Patent No.: US 6,851,532 B2
(45) Date of Patent: Feb. 8, 2005

(54) TORQUE TRANSMITTING APPARATUS

(75) Inventors: Gunnar Back, Bühl /Neusatz (DE); Hubert Friedmann, Bühl (DE); Paul Granderath, Meckenbeuren (DE); Jean-Francois Heller, Illkirch-Grafenstaden (FR); Stephan Maienschein, Bühl (DE); Marc Meisner, Bühl/Weitenung (DE); Bruno Müller, Bühl (DE); Wolfgang Reik, Bühl (DE)

(73) Assignee: LuK Lamellen und Kupplungsbau GmbH, Buhl/Baden (DE)

( * ) Notice: Subject to any disclaimer, the term of this patent is extended or adjusted under 35 U.S.C. 154(b) by 0 days.

(21) Appl. No.: 09/842,362

(22) Filed: Apr. 25, 2001

(65) Prior Publication Data

US 2002/0027053 A1 Mar. 7, 2002

(30) Foreign Application Priority Data

Apr. 28, 2000 (DE) .......................................... 100 20 907

(51) Int. Cl.[7] ........................... F16H 45/02; F16D 13/72
(52) U.S. Cl. ................... 192/3.3; 192/3.29; 192/113.35; 192/113.36
(58) Field of Search ................................ 192/3.3, 3.29, 192/113.36, 113.35

(56) References Cited

U.S. PATENT DOCUMENTS

| | | | |
|---|---|---|---|
| 4,969,543 A | * 11/1990 | MacDonald | ................ 192/3.29 |
| 5,056,631 A | * 10/1991 | MacDonald | ................ 192/3.29 |
| 5,501,309 A | 3/1996 | Walth et al. | |
| 5,674,155 A | 10/1997 | Otto et al. | |
| 5,711,730 A | 1/1998 | Friedman et al. | |
| 5,738,198 A | 4/1998 | Walth et al. | |
| 5,779,012 A | * 7/1998 | Middelmann et al. | ....... 192/3.3 |
| 5,782,327 A | 7/1998 | Otto et al. | |
| 5,860,863 A | 1/1999 | Friedmann et al. | |
| 5,865,283 A | * 2/1999 | Hirayanagi et al. | ........ 192/3.29 |
| 5,975,260 A | * 11/1999 | Fischer et al. | ............. 192/3.29 |
| 6,047,806 A | * 4/2000 | Sasse | .................... 192/113.36 |

FOREIGN PATENT DOCUMENTS

DE 36 14 158 4/1986

* cited by examiner

*Primary Examiner*—Rodney H. Bonck

(57) ABSTRACT

A hydrokinetic torque converter with a built-in bypass clutch is provided with an arrangement which regulates the cooling of the clutch at a rate dependent upon the slip between the coaxial driving and driven parts of the clutch, and hence upon the quantity of generated friction heat. The cooling unit for the driving and/or driven part of the clutch can employ, for example, one or more pumps; a supply of a substance which changes its aggregate state from liquid to gaseous or from solid to flowable in response to heating, and vice versa in response to cooling; one or more porous washers in the path for the flow of hydraulic fluid between the customary plenum chambers provided in the housing of the torque converter to move a piston of the driven part of the clutch into and from frictional engagement with the housing; and/or a system of recesses, grooves, channels and/or other passages serving to convey fluid between the chambers at a rate which is higher or highest when the clutch operates with maximum slip. Such rate can decrease to zero when the torque converter is idle or the clutch is fully engaged to operate without slip.

8 Claims, 18 Drawing Sheets

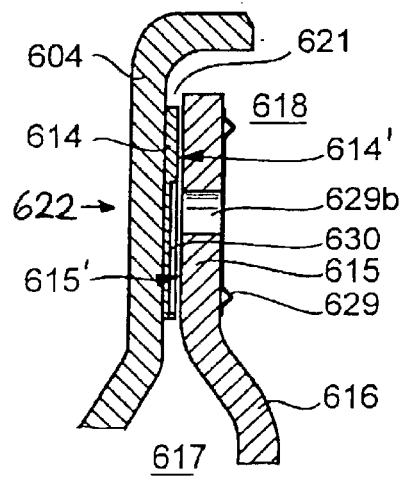 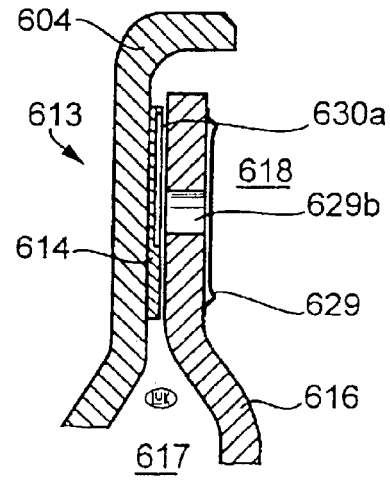
Fig. 16a  Fig. 16b
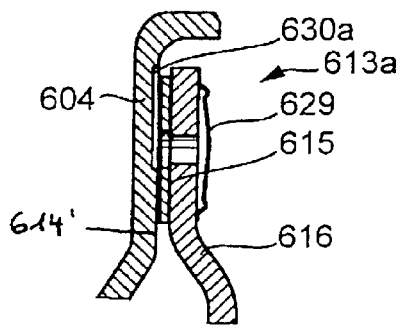 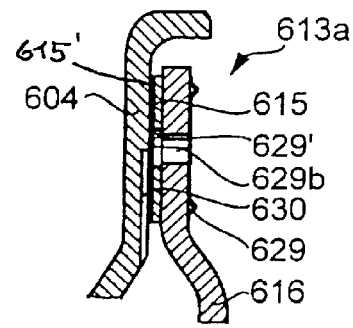
Fig. 17a  Fig. 17b
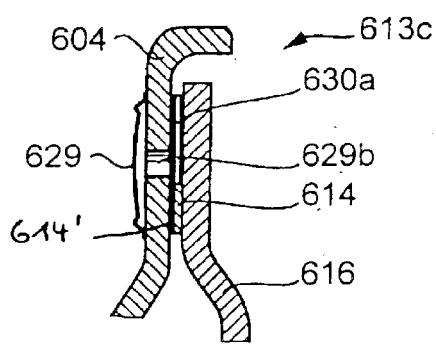 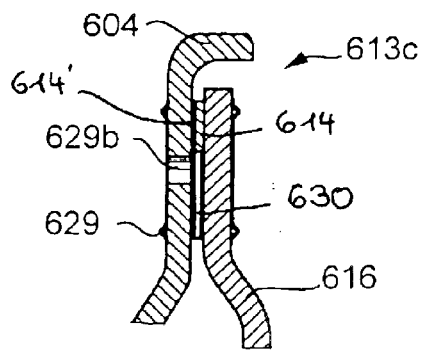
Fig. 18a  Fig. 18b

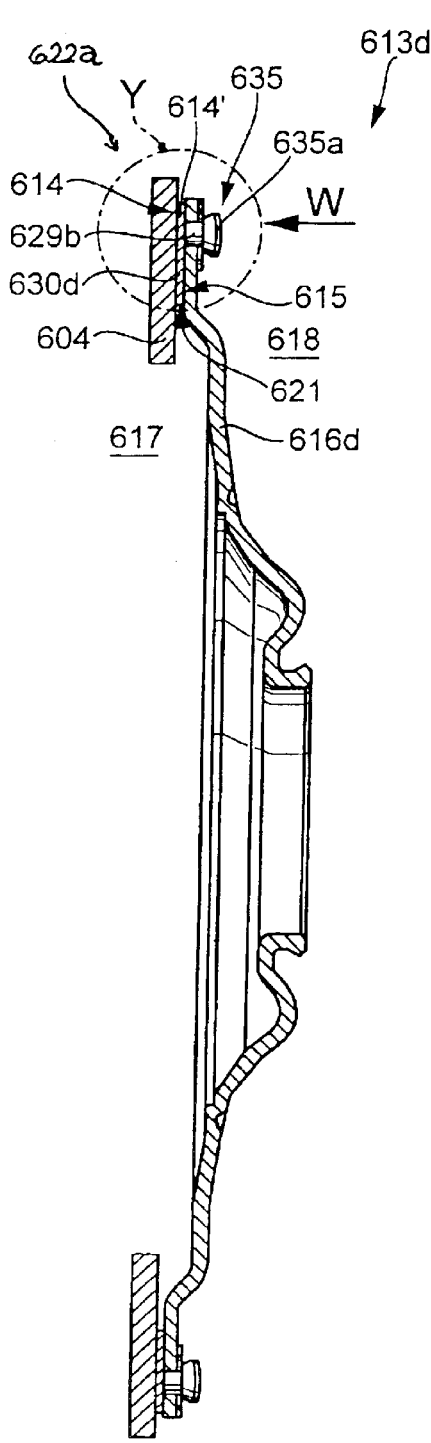
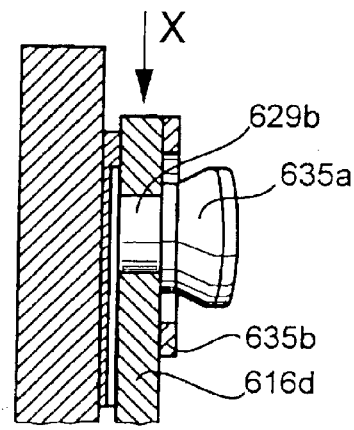
Fig. 26
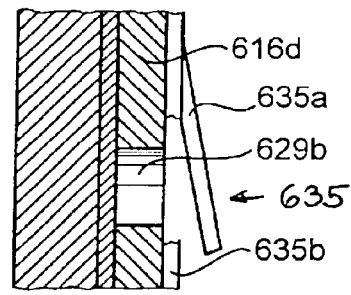
Fig. 27
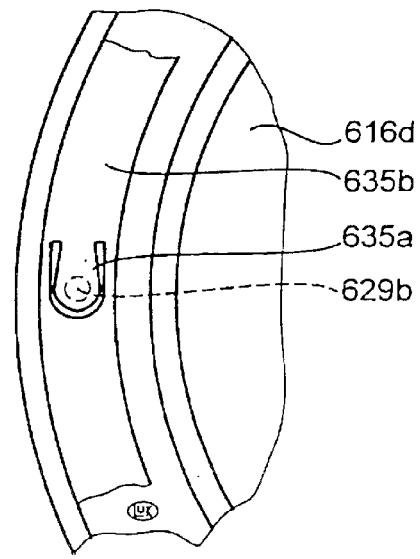
Fig. 25
Fig. 28

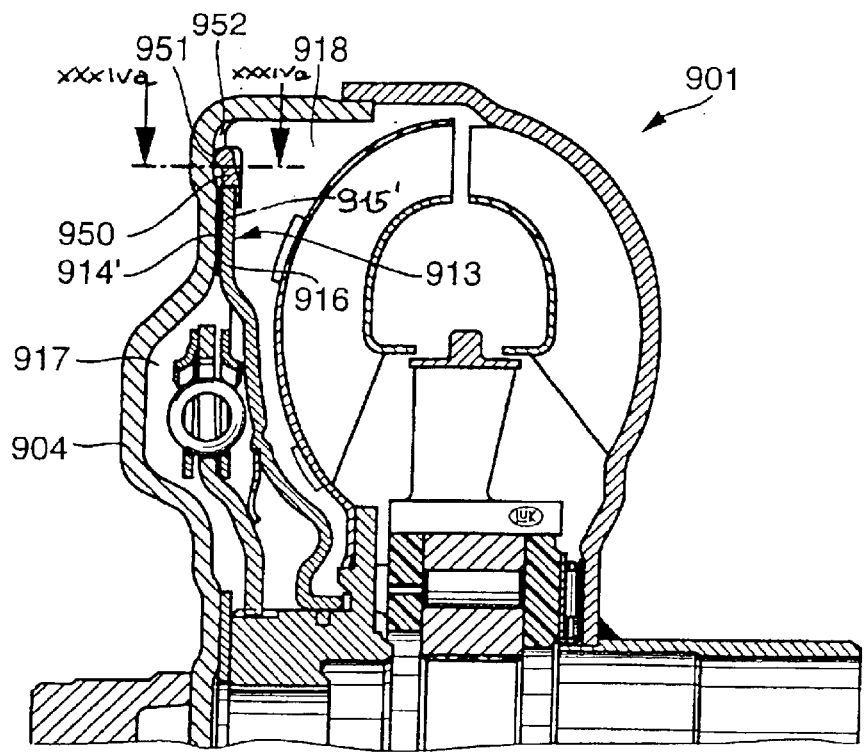
Fig. 33
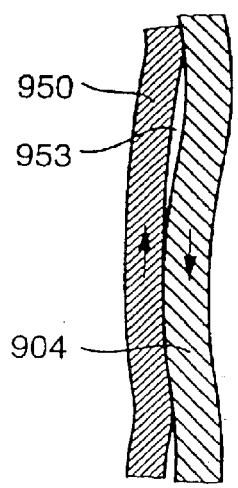 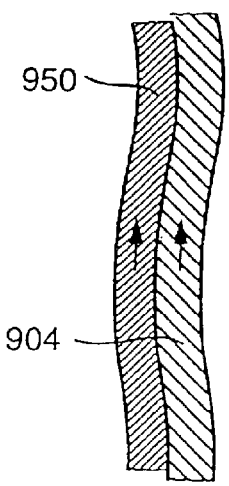
Fig. 34a   Fig. 34b

TORQUE TRANSMITTING APPARATUS

CROSS-REFERENCE TO RELATED CASES

The present application claims the priority of the commonly owned copending German patent application Serial No. 100 20 907.6 filed Apr. 28, 2000. The disclosure of the above-reference German patent application, as well as that of each U.S. and foreign patent and patent application identified in the specification of the present application, is incorporated herein by reference.

BACKGROUND OF THE INVENTION

The present invention relates to improvements in torque transmitting apparatus, and more particularly to improvements in hydrokinetic torque converters of the type often utilized in the power trains of motor vehicles, e.g., to transit torque between the output element of a prime mover (such as a crankshaft or a camshaft of a combustion engine) and the input shaft of a change-speed transmission.

A torque converter of the character to which the present invention pertains normally comprises a rotary housing which is driven by the prime mover and drives a vaned pump, a vaned turbine which can be rotated by the body of fluid filling the housing and being circulated by the pump when the prime mover is on, an optional stator between the pump and the turbine, and a so-called bypass clutch or lockup clutch (hereinafter called bypass clutch) which can be engaged to transmit torque from the housing directly to the turbine or to a hub which rotates with the turbine and serves to transmit torque to the input shaft of the transmission.

The bypass clutch can operate with or without slip and is engageable and disengageable by moving a piston into or from full or partial frictional engagement with a portion of the housing or with a part which rotates with the housing. The housing contains two fluid-filled plenum chambers and the piston is moved axially to partly or fully engage or disengage the clutch in response to changes of pressure differential between the bodies of fluid filling the two plenum chambers. The torque converter often further comprises one or more torsional vibration dampers operating between the housing and the turbine and/or between the turbine and the hub.

A torque converter of the above outlined character is disclosed, for example, in German patent No. 36 14 158. The patented apparatus employs a bypass clutch which operates between the housing and an axially movable piston which rotates with the hub. Such apparatus are known as twin-channel torque converters wherein the piston of or for the bypass clutch separates the plenum chambers from each other when the bypass clutch is at least partially engaged so that a friction lining on the piston engages and receives torque from a portion (e.g., a radial wall) of the housing or from a friction lining on the housing. Partial engagement of the bypass clutch involves a slip of the piston relative to the housing and/or vice versa, and such slip results in the generation of heat in such quantities that the fluid medium in the housing of the torque converter is not always capable of absorbing excess heat. Excessive heating of friction linings forming part of the bypass clutch can entail damage to and frequently rapid destruction of the friction linings; in addition, overheating can adversely influence the hydraulic fluid in the housing of the torque converter.

Abrupt full engagement of the bypass clutch, i.e., without slip, is likely to be even more damaging to the torque converter and can also adversely affect the comfort to the occupant(s) of the motor vehicle. Thus, an abrupt transition from disengagement to full engagement of the bypass clutch can be a cause of discomfort to the occupant(s). In other words, the ride is much more comfortable if the bypass clutch of the torque converter is engaged gradually with an initially pronounced and thereupon gradually decreasing slip, i.e., with the generation of large quantities of undesirable friction heat. Thus, it is desirable to devise a torque converter wherein the bypass clutch is fully engaged upon a gradual reduction of slip but the thus developing large quantities of friction heat can be dissipated and/or otherwise disposed of without affecting the comfort to the occupant(s) of the motor vehicle (if the torque converter is installed in the power train of a motor vehicle) and without damage to the friction linings and/or other heat-sensitive parts of the torque converter and of its bypass clutch. Such requirements cannot be met, or cannot be adequately satisfied, by presently known torque converters. It is also desirable and important to ensure that the withdrawal of requisite quantities of heat be effected without unduly increasing the space requirements of the torque converter, especially in the power train of a motor vehicle.

OBJECTS OF THE INVENTION

An object of the instant invention is to provide a novel and improved arrangement which renders it possible to withdraw heat from and/or to dissipate heat in a torque converter at a rate which is required to avoid damage to various heated heat-sensitive parts and/or substances, such as friction linings, oil, transmission fluid and the like.

Another object of the invention is to provide a simple, compact and relatively inexpensive heat exchange system which can be incorporated in existing types of hydrokinetic torque converters and which can be readily set up or designed to ensure adequate withdrawal of excess heat at a rate which varies or which can vary proportionally with variations of the quantities of surplus heat.

A further object of our invention is to provide a novel and improved method of removing heat from the bypass clutch of a hydrokinetic torque converter in such a way that the presently preferred construction and/or mode of operation of the bypass clutch can remain at least substantially unchanged.

An additional object of the invention is to provide a novel and improved bypass clutch for use in hydrokinetic torque converters.

Still another object of the invention is to provide a torque converter wherein the parts of the bypass clutch and the hydraulic fluid can be shielded from overheating even though the connections to the source(s) of hydraulic fluid and the paths for the flow of fluid into, within and from the housing of the torque converter remain at least substantially unchanged.

A further object of the instant invention is to provide the hydrokinetic torque converter with a cooling system which is or which can be set up to be effective only when a withdrawal of heat from the bypass clutch and/or from hydraulic fluid is advisable or actually necessary.

Another object of the invention is to provide a cooling system which can be installed in or incorporated into existing torque converters in such a way that it adds little, if anything, to the space requirements as seen in the radial and/or in the axial direction of the torque converters.

An additional object of the invention is to provide novel and improved friction linings for use in the bypass clutches of hydrokinetic torque converters, e.g., for utilization in the power trains of motor vehicles.

Still another object of the invention is to provide novel and improved fluid agitating devices for use in a torque converter wherein the bypass clutch is designed to operate with slip.

A further object of the invention is to provide a novel and improved fluid flow regulating arrangement which embodies or forms part of the aforementioned cooling system and can be incorporated into existing types of hydrokinetic torque converters using bypass clutches which operate in a manner necessarily involving the generation of substantial quantities of friction heat.

SUMMARY OF THE INVENTION

One feature of the present invention resides in the provision of a hydrokinetic torque converter which comprises a housing rotatable about a predetermined axis, a pump which is rotatable by the housing about the predetermined axis and can be of one piece with the housing, a turbine which is rotatable in the housing about the predetermined axis by the pump (actually by the supply of fluid which is circulated in the housing by the pump when the torque converter is in use), means for rotating the housing (such means can include a camshaft or a crankshaft receiving torque from a prime mover such as a combustion engine, an electric motor, a gas turbine, or a hybrid prime mover in the power train of a motor vehicle), an output element (such as the input shaft of the change-speed transmission in the power train of a motor vehicle) which is rotatable about the predetermined axis and is arranged to receive torque from the turbine, and a fluid-operated bypass clutch which is disposed in the housing and is arranged to transmit variable torque between the housing and the output element. The clutch includes a driving component rotatable with the housing and a driven component rotatable with the output element and movable axially of the housing into and from frictional engagement—with and without slip—with the aforesaid driving component. The improved torque converter further comprises means for moving the driven component relative to the driving component in the axial direction of the housing (such moving means comprises first and second plenum chambers containing bodies of hydraulic fluid at variable pressure with the provision for fluid flow between the chambers through the clutch), and means for regulating the fluid flow between the chambers in dependency upon the magnitude of torque being transmitted by the clutch when the latter is at least partially engaged.

The regulating means preferably comprises means for automatically altering the rate of fluid flow between the plenum chambers in response to variations of the slip between the driving and driven components.

The regulating means can also comprise at least one channel (such as a recess or groove or the like) which is provided in at least one of the driving and driven components and is arranged to establish a path for the flow of fluid between the plenum chambers when the clutch is operated with slip.

The regulating means is designed to increase the rate of fluid flow between the chambers in response to increasing slip of the driving and driven components relative to each other.

The regulating means can include means for regulating the rate of fluid flow between the plenum chambers in dependency upon changes of RPM between the means for rotating the housing and the output element.

The torque converter can further comprise means for varying the pressure of fluid in at least one of the plenum chambers independently of the regulating means. Such varying means is or can be operative to vary the pressure of fluid in the at least one chamber as a function of changes of the RPM of the means for rotating the housing.

The viscosity of fluid in the flow between the plenum chambers varies in response to the changes of the extent of slip between the driving and driven components, and the rate of fluid flow between the plenum chambers can be regulated in response to variations of the viscosity of fluid.

As a rule, the temperature of fluid in the flow between the plenum chambers varies in response to changes of the extent of slip between the driving and driven components, and the regulating means can change the rate of fluid flow in dependency on such temperature changes.

The regulating means can be provided with at least one channel which is machined or otherwise provided in at least one of the driving and driven components to establish a path for the flow of fluid between the chambers when the clutch is operated with slip, and such regulating means can comprise an adjustable barrier which determines the rate of fluid flow in the at least one channel.

The driven component can comprise a piston and at least one of the driving and driven components can comprise a friction lining which contacts the other component in the engaged condition of the clutch. The driving component can form part of or can be affixed to the housing and the piston can be non-rotatably but axially movably mounted on the turbine or on the output element of the torque converter. Such piston can be arranged to at least partially seal the plenum chambers from each other, at least while the driven component frictionally engages the driving component.

It is also possible to provide each of the driving and driven components with a friction lining, and such friction linings can be and normally are mounted in such a way that they contact each other in the partly or fully engaged condition of the bypass clutch.

The bypass clutch can be constructed in such a way that the driving component forms part of the torque converter housing and that the driven component comprises a piston which at least partially seals the plenum chambers from each other in the engaged condition of the bypass clutch.

The bypass clutch can further comprise a preferably resilient friction lamella which is disposed between the driving and driven components and is movable axially of the torque converter housing, in response to axial movement of the driven component, to a position of frictional engagement with the two components in the partly or fully engaged condition of the bypass clutch. The driven component can comprise a piston which is rotatable with the housing, and such clutch preferably further comprises at least one friction lining which is or can be provided on the lamella and frictionally engages one of the driving and driven components in the engaged condition of the bypass clutch. The arrangement can be such that the clutch further comprises a first friction lining which is carried by the lamella or by the driving component and engages the driving component or the lamella in the engaged condition of the clutch, and a second friction lining which is carried by the lamella or the driven component and engages the driven component or the lamella in the engaged condition of the clutch. Alternatively the just described embodiment of the clutch can comprise at least one friction lining which is provided on the driving or driven component and frictionally engages the lamella in the fully or partly engaged condition of the clutch.

The torque converter or the regulating means can comprise one or more cooling units for the bypass clutch; such cooling unit(s) can be set up to exchange heat with the driving and/or with the driven component.

In accordance with another presently preferred embodiment, the bypass clutch further comprises at least one friction lining which is borne by one of the driving and driven components and frictionally engages the other component in the partly or fully engaged condition of the clutch. The driving and driven components and the at least one friction lining are provided with friction surfaces each of which engages another of the surfaces at least in the engaged condition of the clutch, and the regulating means of the torque converter embodying the just described bypass clutch can be provided with recesses which extend at least substantially radially of the housing axis and are machined, impressed or otherwise provided in at least one of the surfaces to establish at least a portion of the fluid flow in the engaged condition of the bypass clutch. For example, the recesses can be provided in the surface of the driving and/or driven component and can be embossed into the respective friction surface. Alternatively, the recesses can be formed by displacing some material of the driving and/or driven component and/or friction lining, e.g., by impressing grooves into one side of the friction lining to thus develop raised portions at the other side of the friction lining; the grooves at the one side of the friction lining can constitute a set of recesses, and the depressions between the raised portions can serve as another set of recesses.

The friction lining can resemble a washer and, if the recesses are provided in the surface of at least one of the driving and driven components, such recesses can extend radially of the axis of the torque converter housing and the lengths of at least some of such radially extending recesses can exceed the radial width of the friction lining; the latter overlies only portions of such recesses in the engaged condition of the bypass clutch.

The recessed surface (or each recessed surface) can be provided with an annular array of between about 8 or 10 and 400 recesses, preferably between about 100 and 300 recesses. The lengths of such radially extending recesses can be in the range of between 10 and 50 mm, preferably between 10 and 30 mm, and their depths can be less than 0.3 mm, preferably less than 0.15 mm. The widths of at least some of the recesses can be in the range of between 0.2 and 20 mm, preferably between 0.1 and 1 mm.

The ratio of the area taken up by the recesses to the area of the non-recessed portion of the at least one surface can be within the range of between about 2:1 and 1:200, preferably between about 1:1 and 1:10. Otherwise stated, if the recessed surface is to engage a flat surface, between 33% and 95% (preferably between 50% and 91%) of the flat surface are in actual contact with the recessed surface. At least some of the edges of the recessed surface bounding the recesses can be chamfered or bevelled (e.g., rounded).

If the bypass clutch employs a friction lamella which is disposed between the driving and driven components, the recesses can be provided in one or both surfaces of the lamella, i.e., i.e., in the surface confronting the driving component and/or in the surface confronting the driven component. Such recesses form part of the regulating means in that they establish paths for the flow of fluid between the plenum chambers in the partly or fully engaged condition of the clutch. Each component, or at least that component which faces a single recessed surface of the lamella, can be provided with a friction lining which engages the recessed surface in the engaged or partly engaged condition of the bypass clutch. The recesses in one or both surfaces of the lamella can include first recesses which are open inwardly toward the axis of the torque converter housing and second recesses which are open outwardly away from such axis. Individual second recesses or groups of second recesses can alternate with individual first recesses or groups of first recesses, as seen in the circumferential direction of the preferably annular recessed surface or surfaces. At least some of the recesses extend or can extend at least substantially radially of the axis of the torque converter housing.

The torque converter can further comprise a damper which is set up to damp torsional vibrations between the housing of the torque converter and the output element in the engaged condition of the bypass clutch. The damper can be designed to comprise an input having a lamella disposed between and frictionally engaging the driving and driven components in the engaged condition of the clutch, an output arranged to rotate with the output element of the torque converter, and at least one energy storing device (e.g., at least one coil spring or a suitably configured and dimensioned block of rubber or the like) which is interposed between the input and the output to offer a desired resistance to turning of the input and output relative to each other.

The clutch or the regulating means can further comprise at least one porous (i.e., foraminous or permeable) layer which is disposed between the driving and driven components and establishes a plurality of paths for the flow of hydraulic fluid between the plenum chambers in the engaged condition of the bypass clutch. The porous layer can include or constitute an annular disc which contains a sintered material and/or another material that exhibits adequate porosity and can stand mechanical and/or thermal stresses developing in a hydrokinetic torque converter. For example, the porous layer can consist of sintered metal, plastic, glass, a suitable ceramic substance or a mixture or compound of the above enumerated materials. The clutch utilizing the porous layer can further employ a friction lining which is interposed between the driving and driven components; the porous layer can be force-lockingly connected with the driving component, driven component or friction lining.

If the bypass clutch or the regulating means comprises a friction lamella which is disposed between the driving and driven components and is movable axially of the torque converter housing, the housing can be provided with an internal abutment (such as a washer-like structure) which limits the movability of the lamella in one direction and the bypass clutch or the regulating means can be provided with a piston which is movable axially of the housing, which forms part of the driven component and which limits the movability of the lamella in the other direction (as seen axially of the housing of the torque converter). The internal abutment can be axially movably mounted on a portion of the torque converter housing which surrounds the bypass clutch.

At least one of the driving and driven components can consist, at least in part, of a porous material which is employed to establish a plurality of paths for the flow of fluid between the plenum chambers in the engaged condition of the bypass clutch. The other component of such clutch can include a friction lining which abuts the one component in the partially or fully engaged condition of the bypass clutch. For example, a porous member can be riveted to the driving or to the driven component to provide a plurality of paths for the flow of fluid between the plenum chambers in the engaged condition of the clutch.

The regulating means can comprise at least one array of recesses provided in the driving and/or driven component and communicating with one of the plenum chambers, and ports provided in the recessed component and communicating (a) with the recesses and (b) with the other plenum chamber. The recessed component can include at least one friction lining which confronts the other component and is actually provided with the recesses; such recessed component can further comprise a piston which carries the friction lining and is provided with the aforementioned ports.

The recesses can be provided with open ends which communicate with the one plenum chamber, and the ports are or can be located radially outwardly of the open ends of the recesses (it is assumed here that the recesses extend radially outwardly from their respective open ends). The component which is provided with recesses is or can be the driving component and can include a friction lining which is actually provided with recesses; the driven component of such bypass clutch can include a piston actually provided with the ports which are distributed in such a way that they repeatedly communicate with the recesses during operation of the clutch with slip. The arrangement can be such that the ports repeatedly communicate with the recesses only when the clutch is operated with slip. The number of the ports can be different from the number of the recesses, and the regulating means can further comprise open-and-shut valves for the ports.

In accordance with a presently preferred embodiment, each valve comprises a tongue or flap which is movably carried by the at least one component. It is preferred to employ resilient tongues which tend to assume positions in which they permit hydraulic fluid to flow between the respective recesses and the other plenum chamber. The tongues can be arranged to seal the respective recesses from the other chamber in response to changes of fluid pressure in the other plenum chamber relative to the fluid pressure in the one chamber. The arrangement is preferably such that the valves open in response to rotation of the driving and driven components relative to each other The recesses of the at least one array have open ends which communicate with the one chamber and the regulating means can further comprise an annular second array of recesses which are provided in the at least one component to alternate with the recesses of the at least one array. The recesses of the second array have open ends communicating with the other chamber and such recesses repeatedly communicate with the ports while the bypass clutch operates with slip.

The regulating means can include at least one annular array of recesses which are provided in one of the driving and driven components and communicate with one of the plenum chambers, an annular array of ports provided in the other component and repeatedly communicating with successive recesses of the at least one array during operation of the bypass clutch with slip, and bellows which are borne by the other component and each of which communicates with one of the ports. The bellows are contacted by fluid in the other plenum chamber and are deformable in response to the establishment of a sufficient differential between the pressures of fluid bodies in the two plenum chambers. The bellows are or can be resilient and are arranged to receive fluid from the other plenum chamber when the pressures of fluid in the two plenum chambers differ to a predetermined extent. One of the driving and driven components, preferably only the other component, can be provided with a friction lining. The preferably elastic bellows can consist, at least in part, of thin sheet metal or rubber, and the fluid receiving capacities of such bellows are preferably limited. It is often advisable to arrange a relatively large number of bellows in a circle; such circle can comprise between about 3 and 36 bellows, preferably between about 9 and 24 bellows. The other component of the bypass clutch can comprise a piston and the bellows can include sheet metal blanks which are at least substantially sealingly affixed to the piston. It is also possible to employ a plurality of bellows all of which form part of a single piece of sheet-like material affixed to the other component of the bypass clutch. The bellows can be designed in such a way that they normally offer resistance to the inflow of fluid; the arrangement is or can be such that the bellows are inflatable against the resistance of fluid in the other plenum chamber. At least one of such bellows can include a sheet metal member which is affixed to the other component and is arranged to move by snap action between first and second positions in which the fluid receiving capacity of the at least one bellows respectively assumes a relatively large and a relatively small value. The regulating means employing such bellows can further comprise at least one stop which is arranged to limit the extent of movement of the sheet metal member by snap action to at least one of the first and second positions. Such at least one stop can be arranged to prevent a movement of the sheet metal member beyond the second position. The other component of the bypass clutch in a torque converter having regulating means operating with bellows can include a piston and the at least one stop can form part of such piston.

Each of the aforementioned ports is preferably arranged to admit fluid into and to provide a path for expulsion of fluid from a discrete bellows; the ports can be arranged to establish communication between the interiors of the respective bellows and the other plenum chamber; the one component of the bypass clutch can include a friction lining and the recesses can be provided in the friction lining. The recesses can be provided with enlarged portions communicating with successive ports of the annular array of ports when the clutch is operated with slip. For example, the recesses having enlarged portions can constitute substantially T-shaped recesses.

In accordance with a further embodiment, the regulating means can comprise an annular undulate surface which is provided on one of the driving and driven components, and a sealing member having a second surface adjacent the undulate surface and provided on the other component. These surfaces establish a plurality of paths for the flow of fluid only when the bypass clutch is operated with slip. The undulate surface can be provided on a deformable ring-shaped member of a piston forming part of the one component. The ring-shaped member can be provided on a radially outermost portion of the piston, i.e., on a portion which is remote from the axis of the torque converter housing. The second surface can be provided on such housing.

As already mentioned before, the regulating means can include means for pumping hydraulic fluid between the plenum chambers.

The driven component of the bypass clutch can include a first piston and the regulating means can comprise an auxiliary (second) piston defining with the first piston a third chamber which communicates with the plenum chambers by way of passages provided in at least one of the driving and driven components.

The regulating means can comprise a cooling unit which is provided at that side of one of the driving and driven components which faces away from the other component; the cooling unit can employ a third chamber for a supply of coolant. The two components can frictionally engage each other at a first radial distance from the axis of the torque converter housing in the at least partly engaged condition of the clutch, and the third chamber can be dimensioned and configured in such a way that it includes a first portion at the first radial distance from the axis and a second portion at a lesser second radial distance from the axis. Such third chamber can be outwardly adjacent the housing of the torque converter; alternatively, the driven component can include a piston located in the housing of the torque converter, and the third chamber is adjacent that side of such piston which faces away from the driving component.

It is also possible to employ a cooling unit which comprises a substantially cup-shaped enclosure for the third chamber; such enclosure is sealingly affixed to one of the driving and driven components. The enclosure can be secured to the one component by at least one of the undertakings including welding, caulking and snap action.

The coolant can be selected from the group consisting of water and a liquefied gaseous fluid. Such coolant can be arranged to exchange heat with at least one of the driving and driven components in accordance with evaporation enthalpy. If the coolant is a liquid at lower temperature, it changes its aggregate state by convection to a gaseous state in response to heating as a result of contact with at least one of the driving and driven components. The change of aggregate state can be effected under the action of centrifugal force when the driving and driven components rotate and the clutch operates with slip.

In accordance with a presently preferred embodiment, the cooling unit is constructed in the following way: The driving and driven components of the bypass clutch frictionally engage each other at a first radial distance from the axis of the torque converter housing in at least partly engaged condition of the clutch. The third chamber (i.e., the chamber for the supply of coolant) includes a first portion at the first radial distance from the axis and a second portion at a lesser second radial distance from the axis. The coolant is a liquid which at least partially fills the first portion of the third chamber and assumes a gaseous aggregate sate in the second portion of the third chamber with a tendency to become a liquid and to flow back to the first portion of the third chamber under the action of centrifugal force in response to cooling of the gaseous phase in the second portion of the third chamber.

In addition to or in lieu of the already described undertakings involving the enhancement of exchange of heat between the fluid filling the plenum chambers and the fluid flowing between such chambers on the one hand, and the adjacent structural elements of the torque converter and its bypass clutch on the other hand, it is possible to simply agitate the fluid within the housing of the torque converter. To this end, the regulating means can comprise at least one blade or vane (hereinafter called blade) which is provided on the turbine and is preferably adjacent one of the driving and driven components of the bypass clutch (particularly the driven component) to agitate some of the fluid in the housing of the torque converter. The at least one blade is or can be affixed (such as welded, glued or riveted) to or can be of one piece with the turbine. It is also possible to make the at least one blade of one piece with one of the customary vanes provided at that side of the turbine which confronts the vanes of the pump forming part of the torque converter. For example, each vane of the turbine can be of one piece with one of the blades. If the bypass clutch comprises one or more friction linings, the blade or blades of the turbine can be adjacent the single friction lining or one of several friction linings.

It is often advisable to provide the turbine with an anular array of preferably equidistant blades. Such array of blades can be mounted on or can form part of an annular carrier which is affixed to the turbine.

If the regulating means of the improved torque converter comprises at least one pumping device, such device can be arranged to convey fluid from one of the plenum chambers into the other plenum chamber and/or to convey fresh fluid from a source into one or both plenum chambers and/or to enhance the flow of fluid from one or both plenum chambers when the bypass clutch is operated with slip. In accordance with one presently preferred embodiment, the at least one pumping device comprises a pump body having first and second openings which respectively communicate with a source of fresh or recycled fluid and with one of the plenum chambers, and a spherical or otherwise configurated pumping element which is reciprocable in the pump body to effect a transfer of fluid from the source to the one chamber. The at least one pumping device can be installed in or on a hub which surrounds the output element (such as the input shaft of the change-speed transmission) of the torque converter. The pumping element seals one of the two openings in the pump body when the bypass crutch is operated without slip. At least one of the driving and driven components can include a friction lining which is remote from the axis of the torque converter housing, and the at least one pumping device can be installed in the housing in such a way hat it is adjacent the friction lining. Furthermore, the at least one pumping device can be arranged to communicate with at least one of the plenum chambers by way of recesses provided in one of the driving and driven components. These recesses can have open ends which communicate with the one plenum chamber of the torque converter, and such regulating means can include additional recesses which are sealed from the one plenum chamber. The recesses can be provided in the one or in the only friction lining of the bypass clutch.

The regulating means can comprise an annular array of pumping devices which are or which can be equidistant from each other and which are or can be identical.

Another feature of the present invention resides in the provision of a hydrokinetic torque converter which comprises a housing rotatable about a predetermined axis, a pump which is rotatable by the housing about such axis, a turbine which is rotatable in the housing about the latter's axis by as well as relative to the pump, means for rotating the housing, an output element which is rotatable about the axis of the housing and is arranged to receive torque from the turbine, and a fluid-operated bypass clutch which is arranged to transmit variable torque between the housing and the output element independently of the turbine. The clutch includes a first part which is rotatable with the housing, a second part which is rotatable with the output element, and friction generating means operable to transmit torque between the first and second parts with and without slip with attendant generation of friction heat during operation with slip. The torque converter further comprises first and second plenum chambers which contain bodies of hydraulic fluid at variable pressure with the provision for fluid flow between the plenum chambers past the friction generating means, and means for regulating the fluid flow in dependency upon the magnitude of torque being transmitted by the clutch.

The just discussed torque converter can further comprise torsional vibration damping means operating between the first part of the bypass clutch and at least one of the second part of the friction clutch, the turbine and the output element. Such torque converter can further comprise a stator which is provided in the housing intermediate the Dump and the turbine.

A further feature of our invention resides in the provision of a hydrokinetic torque converter which comprises a housing rotatable about a predetermined axis, a pump rotatable by the housing about such axis, a turbine rotatable in the housing by and relative to the pump, means for rotating the housing, an output element which is rotatable about the axis of the torque converter housing and is arranged to receive torque from the turbine, and a fluid-operated bypass clutch which is arranged to transmit variable torque between the housing and the output element. The pump comprises a driving component rotatable with the housing and a driven component including a piston rotatable with the output element and movable in the housing axially into and from frictional engagement—with and without slip—with the driving component, and the torque converter further comprises means for moving the piston including first and second plenum chambers in the housing, means for supplying to the plenum chambers hydraulic fluid at variable pressure with the provision for fluid flow between the chambers through the clutch, and adjustable means for regulating the fluid flow between the chambers in dependency upon the magnitude of torque being transmitted by the clutch. Such adjustable regulating means is or can be adjacent at least one of the driving and driven components of the bypass clutch.

Still another feature of the present invention resides in the provision of a method of cooling an engageable and disengageable bypass clutch which is installed in the rotary housing of a hydrokinetic torque converter and has coaxial rotary driving and driven components which frictionally engage each other when the clutch is at least partly engaged. The partial engagement involves (i.e., results in) a slip of the components of the bypass clutch relative to each other. The method comprises the steps of providing in the housing first and second plenum chambers and maintaining in the plenum chambers bodies of hydraulic fluid arranged to at least partly engage the clutch in response to the establishment of adequate pressure differential between the two bodies of fluid, establishing at least one path for the flow of fluid between the plenum chambers by way of the clutch, at least in the part y engaged condition of the clutch, and regulating the flow of fluid along the at least one path in dependency upon (i.e., as a function of) the extent of slip between the driving and driven components.

The regulating step can include increasing the rate of fluid flow along the at least one path when the clutch operates with slip and reducing such rate when the clutch operates without slip.

The regulating step can also include interrupting the flow of fluid along the at least one path when the clutch is operated without slip, i.e., when the generation of friction heat is reduced to zero.

The regulating step can include installing an adjustable valve in the at least one path.

The step of establishing the aforementioned at least one path can include providing the driving and driven components of the clutch with pluralities of first and second passages (such as channels, recesses, grooves or the like) for the flow of fluid to and from the first and second plenum chambers, and the regulating step of such method can include establishing communication between the first and second passages at a frequency which increases in response to increasing slip of the driving and driven components of the bypass clutch relative to each other.

The regulating step can include pumping the fluid along the at least one path at a rate which increases in response to increasing slip of the driving and driven components of the bypass clutch relative to each other.

Still further, the regulating step can include continuously contacting at least one of the driving and driven components of the bypass clutch with a confined supply of coolant which changes its aggregate state in response to changes of temperature of the at least one component of the bypass clutch.

The novel features which are considered as characteristic of the invention are set forth in particular in the appended claims. The improved hydrokinetic torque converter itself, however, both as to its construction and modes of assembling, installing and operating the same, together with numerous additional important and advantageous features and attributes thereof, will be best understood upon perusal of the following detailed description of certain presently preferred specific embodiments with reference to the accompanying drawings.

BRIEF DESCRIPTION OF THE DRAWINGS

FIG. 16a is a fragmentary axial sectional view of a bypass clutch which can utilize a piston with bellows of the type shown in FIGS. 14 and 15, the bellows being shown in deflated condition;

FIG. 16b shows the structure of FIG. 16a but with the bellows inflated;

FIG. 17a is a fragmentary axial sectional view similar to that of FIG. 16a but employing a housing of the type shown in FIGS. 9, 13 and 13a, the bellows being shown in inflated condition;

FIG. 17b shows the structure of FIG. 17a but with the bellows deflated;

FIG. 18a is a view similar to that of FIG. 16b or 17a but showing a further bypass clutch;

FIG. 18b shows the structure of FIG. 18a but with the bellows deflated;

FIG. 25 is a fragmentary axial sectional view of a bypass clutch constituting a modification of that shown in the torque converter of FIG. 8;

FIG. 26 is an enlarged view of the detail within the phantom-line circle Y shown in FIG. 25;

FIG. 27 is a view as seen in the direction of arrow X shown in FIG. 26;

FIG. 28 is a view as seen in the direction of arrow W shown in FIG. 25;

FIG. 33 is a fragmentary axial sectional view of a torque converter employing a further embodiment of cooling means for the component parts of the bypass clutch and for the fluid;

FIG. 34a is an enlarged fragmentary sectional view of the bypass clutch as seen in the direction of arrows from the line XXXIVa—XXXIVa shown in FIG. 33, the cooling system being operative to withdraw heat from the partly engaged bypass clutch;

FIG. 34b illustrates the structure of FIG. 34a but with a sealing element of the bypass clutch in a position in which the cooling unit for the bypass clutch is idle.

DESCRIPTION OF PREFERRED EMBODIMENTS

Figure 1:
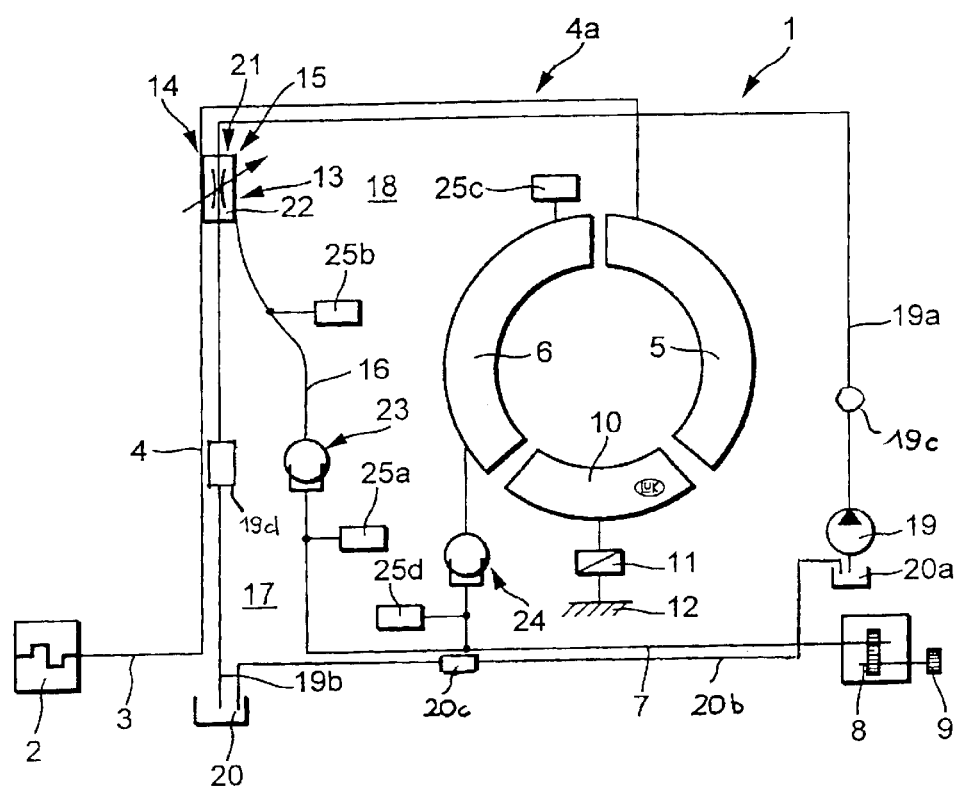
FIG. 1 is a diagrammatic view of a power train which serves to transmit torque from a prime mover to the wheels of a motor vehicle and employs a hydrokinetic torque converter embodying a bypass clutch which can be cooled in accordance with the present invention.

Referring first to FIG. 1, there is shown a hydrokinetic torque converter 1 having a housing 4a rotatable about a predetermined axis (see the axis X—X shown in FIG. 2) by a prime mover 2. The latter can constitute an internal combustion engine of the type employed in motor vehicles, an electric motor, a gas turbine or a hybrid drive means. The output shaft 3 of the prime mover 2 can be fixedly or force-lockingly connected with a portion 4 of the housing 4a in any one of a number of different ways. The portion 4 which is shown in FIG. 1 is a flexible annular metallic washer-like wall which drives the other part or parts of the housing 4a and also a rotary pump 5 of the torque converter 1. A turbine 6 of the torque converter is coaxial with and is normally rotated or can be rotated by the pump 5 by way of a body of hydraulic fluid in the housing 4a. FIG. 1 further shows a stator 10 which constitutes an optional part of the torque converter 1.

The output element 7 of the torque converter 1 shown in FIG. 1 is the input shaft of a change-speed transmission 8 which can transmit torque to one or more wheels 9 of a motor vehicle by way of a differential and one or more wheel axles in a manner well known in the art and not forming part of the present invention. Reference may be had, for example, to commonly owned U.S. Pat. No. 5,501,309 granted Mar. 26, 1996 to Walth et al. for "HYDROKINETIC TORQUE CONVERTER WITH LOCKUP CLUTCH", U.S. Pat. No. 5,674,155 granted Oct. 7, 1997 to Otto et al. for "METHOD OF AND APPARATUS FOR TRANSMITTING TORQUE IN THE POWER TRAINS OF MOTOR VEHICLES", U.S. Pat. No. 5,738,198 granted Apr. 14, 1998 to Walth et al. for "FRICTION ELEMENT FOR USE IN CLUTCHES", and U.S. Pat. No. 5,782,327 granted Jul. 21, 1998 to Otto et al. for "HYDROKINETIC TORQUE CONVERTER AND LOCKUP CLUTCH THEREFOR".

The transmission 8 can constitute a manual or automatic transmission or a continuously variable transmission (CVT) with an endless link chain and adjustable pulleys.

Though the stator 10 is optional, it is often desirable and necessary, e.g., to vary the torque within certain RPM ranges. In the embodiment of FIG. 1, the stator is mounted on a fixed part 12 (such as an axially expanded tubular part of the housing or case of the transmission 8) by way of a freewheel 11.

A so-called bypass or lockup clutch 13 is provided to bypass the pump 5 and to establish a driving connection between the output element 3 of the prime mover 2 (and more specifically the wall 4) and the turbine 6. The illustrated clutch 13 comprises an axially reciprocable member 16 here shown as a piston which can be moved toward and away from the wall 4. The wall 4 carries an annular driving component 14, and the piston 16 carries an annular driven component 15 of an adjustable friction generating device 21 of the clutch 13. At least one of the components 14, 15 can be provided with a friction lining of the type customarily employed in the friction clutches of the power trains in motor vehicles; such friction lining can be moved into sliding or non-sliding frictional engagement with a friction lining or a metallic cr other suitable member on the other of the components 14 and 15. Such member can be provided with a smooth, roughened and/or otherwise treated surface which can engage the friction lining when the device 21 is to transmit torque between the wall 4 and the piston 16; this piston can transmit torque directly to the input shaft 7 of the transmission 8 or indirectly by way of the turbine 6. That torque which is actually transmitted by the clutch 13 can be a mere fraction of the torque which the wall 4 can transmit to the piston 16 when the frictional engagement between the components 14, 15 is at least substantially free of slip.

The piston 16 is mounted on a hub (corresponding to the hub 106a shown in FIG. 2) which is non-rotatably mounted on the shaft 7 and can also support the turbine 6. The connection between the piston 16 and the shaft 7 includes a first torsional vibration damper 23, and the connection between the turbine 6 and the shaft 7 includes a second torsional vibration damper 24.

The magnitude of torque which is being or which is to be transmitted by the bypass clutch 13 can be regulated by selecting the pressures of bodies of hydraulic fluid confined in or flowing through two chambers 17, 18 defined by the housing 4a of the torque converter 1. The pressure of fluid entering the chamber 18 by way of a conduit 19a is determined by a fluid conveying pump 19 having an intake arranged to draw fluid (such as oil or transmission fluid) from a sump 20a or another suitable source. A pressure limiting relief valve 19c is or can be installed in the conduit 19a. A further conduit 19b serves to convey fluid from the chamber 17 into a reservoir 20, e.g., a sump 20.

When the fluid pressure in the chamber 18 exceeds that in the chamber 17, the piston 16 is moved or urged to the left, as viewed in FIG. 1, so that the component 15 bears upon the component 14 with a force which is proportional to the pressure differential and the wall 4 drives the piston 16 (and hence the turbine 6 and the input shaft 7) with or without slip.

When the pressure differential between the bodies of fluid filling the chambers 17, 18 decreases to a predetermined value, one or more springs or other biasing means (not shown) are free to disengage the component 15 from the component 14, i.e., to disengage the bypass clutch 13. It is also possible to employ a throttle 19d or any other suitable flow restrictor (shown schematically in FIG. 1) in the conduit 19b to predetermine the circumstances under which the bypass clutch 13 is permitted or caused to open so that, from there on, the input shaft 7 can be driven by the wall 4 through the medium of the pump 5, the body of fluid which orbits the vanes of the turbine 6 in response to orbiting of vanes forming part of the pump 5, and the torsional vibration damper 24.

The sumps 20, 20a can form parts of a single sump, they can constitute two discrete identical or different sumps, or they can be connected to each other by one or more conduits 20b which preferably contain one or more fluid cooling units 20c serving to ensure that the inlet of the pump 19 receives a flow of fluid having a temperature not exceeding a preselected maximum permissible value.

The structure which is shown schematically in FIG. 1 can be modified in a number of ways without departing from the spirit of this invention. For example, the pump 19 can be installed in the conduit 19b to draw fluid from the sump 20 and to convey such fluid into the chamber 17 whence the fluid flows (when necessary or desired) into the chamber 18, conduit 19a and sump 20a.

The chambers 17, 18 are sealed from each other in such a way that, when desired or necessary, they can communicate only by way of the bypass clutch 13 (and more specifically by way of the friction generating device 21 including the components 14 and 15).

In accordance with a feature of the present invention, the friction generating device 21 is constructed and assembled and operates in such a way that the components 14, 15 can regulate the flow of fluid between the chambers 17, 18, i.e., that there exists a fluid flow regulating or limiting arrangement 22 which conforms the rate of fluid flow to the momentary requirements, i.e., to the desired or required extent of frictional engagement between the components 14 and 15. The arrangement 22 conforms the extent of fluid flow into and from the chambers 17, 18 to the required or desired or necessary extent of frictional engagement between the components 14 and 15.

The requirements can be such that there normally exists an at least small (such as negligible) rate of flow of pressurized fluid involving a negligible angular displacement of the driving means (including the wall 4) and the driven means (including the input shaft 7) relative to each other, and/or a rate of flow which varies in dependency upon a slip parameter; the operation of the flow regulating arrangement 22 can be controlled in dependency upon (a) the RPMs of the wall 4 and shaft 7, (b) the differential between the pressures of fluid bodies in the chambers 17, 18, (c) the viscosity of the fluid, and/or (d) an evaluation of the just enumerated parameters (a) to (c). It is important and highly desirable, as well as practical for normal use of the torque converter 1, that the operation of the regulating arrangemet 22 take place automatically within the torque converter. The means for effecting such automatic operation of the arrangement 22 can include or resemble the driving and driven components 14, 15 and/or means for metering the flow of fluid through these components.

The slip-dependent regulation or control of the flow of hydraulic fluid exhibits the important advantage that, when the rate of fluid flow increases in response to an increasing difference between the RPMs of the wall 4 and the shaft 7, the components 14, 15 (which generate a larger quantity of heat if the aforementioned difference between the RPMs increases while the components are in frictional engagement with each other) undergo a more pronounced cooling action because the rate of fluid flow from one of the chambers 17, 18, through the device 21 including the components 14, 15, and into the other chamber is more pronounced. Otherwise stated, the temperature of fluid flowing between the chambers 17, 18 via flow regulating arrangement 22 is lower if the speed of fluid flow is higher.

A less pronounced heating of the components 14, 15 is desirable and advantageous because it involves a lesser wear upon the device 21 and also because the composition of the fluid remains unchanged (i.e., acceptable) for a longer interval or period of time. Furthermore, a damming of the fluid by the regulating arrangement 22 in response to a reduced slip exhibits the advantage that the operation of the pump 19 is more economical because the output of the pump must be increased due to higher losses resulting from the flow of fluid into the lower-pressure chamber (i.e., into the chamber 17 within the housing 4a shown in FIG. 1) when the bypass clutch 13 is engaged, namely when the pump output is higher because the pressure of fluid in the chamber 18 (this entails an engagement of the bypass clutch) is raised by the pump.

The dampers 23, 24 counteract torsional vibrations; each of these dampers can be a single-stage or a multistage damper. If the damper 23 and/or 24 is a multistage damper, the individual stages can be set up to operate in series or in parallel. The individual stops of a multistage damper can serve to protect the elastic means between the input and output parts of the damper 23 and/or 24. In addition, one can provide delayed or non-delayed friction generating devices each of which is superimposed upon a single stage or each of which acts upon several stages.

The first damper 23 is installed in the power flow between the bypass clutch 13 and the input shaft 7 of the transmission 8, i.e., it bypasses the turbine 6. The input of this damper is the piston 16, and its output is the aforementioned hub which is non-rotatably but axially movably mounted on the shaft 7 (or which non-rotatably but axially movably supports the piston 6).

The damper 24 is installed between the turbine 6 and the shaft 7. For example, the turbine 6 can be mounted (with limited freedom of angular movement) on a hub which is borne by the shaft 7; the output of the damper 24 is then non-rotatably mounted on such hub. The range of the damper 24 (which is mounted in the just described manner) is determined by the extent to which the turbine 6 can turn relative to the hub on the shaft 7.

It is also possible to replace the dampers 23, 24 with a single damper. For example, the input of such single damper receives torque from the piston 16 and/or from the turbine 6, and its output is operatively connected with the input shaft 7 or with the hub which is non-rotatably mounted on the shaft 7.

The flow regulating or limiting arrangement 22 (or an equivalent thereof) does not constitute the only novel feature of the improved torque converter 1. Thus, this torque converter can be provided with auxiliary masses 25a, 25b, 25c, and 25d which serve to meet (satisfy) specific requirements regarding the damping and/or absorption (elimination) of torsional vibrations. For example, one can rely on the so-called dual mass flywheel effect by installing the auxiliary masses 25b, 25a upstream and downstream of the torsional vibration damper 23 and/or by instaling the auxiliary masses 25c, 25d up-stream and downstream of the damper 24. The auxiliary masses (or one or more such masses) need not constitute separately produced parts, i.e., at least one thereof can constitute a standard component or a group of two or more standard components of a torque converter wherein, in addition to their well known functions, they also serve as auxiliary masses associated with the torque converter 23 or 24. By way of example only, one of the auxiliary masses 25a to 25d can constitute or form part of the turbine 6, of the housing 4a, of one or more portions of the housing 4a and/or others, as long as the moment of inertia and/or the bulk or weight of such multiple-purpose auxiliary mass is satisfactory for utilization in conjunction with the damper 23 or 24.

Still further, it is within the purview of the invention to omit the auxiliary mass 25a and/or 25d, i.e., to utilize only the auxiliary mass(es) 25b, and/or 25c which is or which are installed in the power flow(s) upstream of the respective damper(s) 23 and/or 24. The single auxiliary mass (25b, or 25b) is preferably that mass which is more distant from the axis of the shaft 7, i.e., which is located radially outwardly of the respective torsional vibration damper 23 and/or 24. Stated otherwise, the single auxiliary mass (25b, and/or 25c) is installed in the power flow upstream of the respective damper (23 and/or 24); this enhances the moment of inertia.

It is advisable (and actually highly desirable and advantageous) to install the auxiliary mass(es) in such space or spaces which is or which are available in a hydrokinetic torque consorter; such spaces include, for example, that or those at the radially outer and/or inner torus of the turbine, and in a corner or region of the housing 4a radially outwardly of the piston 16.

The auxiliary mass 25a and/or 25d can be directly or indirectly mounted on the input(s) of the respective damper(s) 23 and/or 24, and the mass 25b and/or 25c can be directly or indirectly mounted on the input(s) of the respective damper 23 and/or 24. For example, and as actually shown in FIG. 1, the auxiliary mass 25b is provided on or forms part of the piston 16 upstream of the damper 23 (as seen in the direction of power flow from the bypass clutch 13 (i.e., from the wall 4) to the input shaft 7. Furthermore, and as also shown in FIG. 1, the auxiliary mass 25c is mounted on or forms part of the turbine 6, i.e., such mass is located in the flow of power toward the input of the damper 24.

Figure 2:
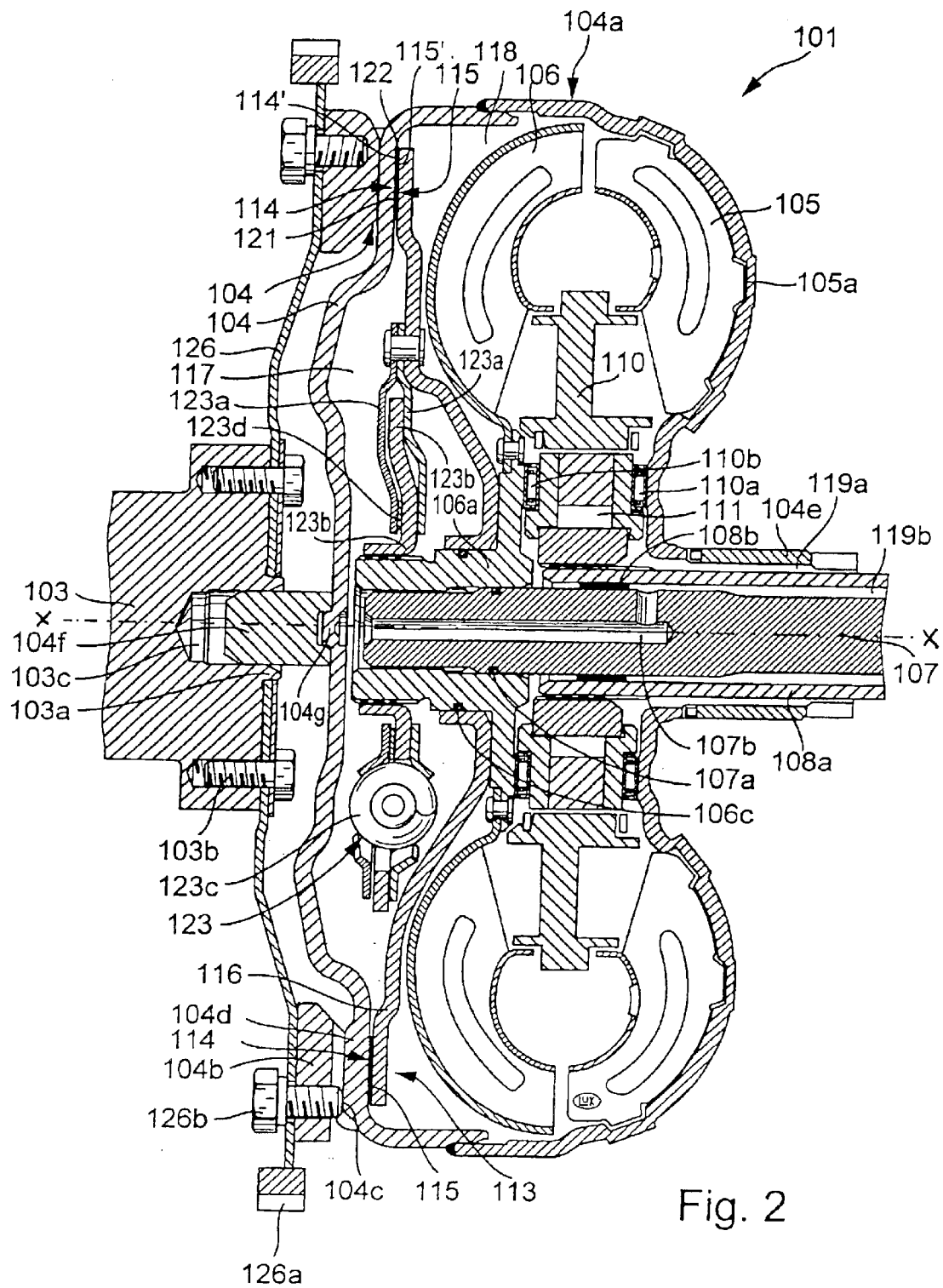
FIG. 2 is an axial sectional view of a hydrokinetic torque converter with a bypass clutch which is cooled by a system or unit embodying a first form of the present invention.

FIG. 2 is an axial sectional view of a torque converter 101 which is driven by the output shaft (such as a crankshaft) 103 of a prime mover, e,g, the engine of a motor vehicle. The shaft 103 has an axially extending centering projection 103a engaging a flexible torque transmitting member 126 which is or which can be made of a metallic sheet material and can be said to form a detachable part of a housing 104a of the torque converter 101. The means for fixedly but separably securing the radially innermost annular portion of the member 126 to the shaft 103 includes an annulus of threaded fasteners 103b. Other types of fasteners can be utilized with equal advantage.

The annular radially outermost portion of the member 126 is non-rotatably connected with an annular starter gear 126a in such a way that the latter cannot move axially of the housing 104a. The rotation-preventing connection between the starter gear 126a and the housing 104a can include mating gear teeth, a caulking, a welded joint or the like. It is also possible to employ a starter gear which is shrunk onto the member 126 or onto another part of the housing 104a.

The member 126 and/or another part of the housing 104a can also serve to carry a set of markers or other suitable indicia which rotate with the housing and form Apart of a means for regulating the operation of the prime mover. An annulus of receptacles 104b is separably connected with the member 126 between the annulus of fasteners 103b and the starter gear 126a; the connection can include threaded fasteners 126b, a self-locking device, a bayonet mount (not shown) or the like.

The receptacles 104b can constitute circular or arcuate bodies and are affixed to the radially outermost portions of the housing 104a, e.g., by welding, by rivets or the like; for example, the housing 104a and/or the member 126 can be provided with projections which are riveted to the receptacles 104b.

The housing 104a can be axially offset at the receptacles 104b so that the receptacles are axially spaced apart and provided room for the fastening of the member 126 on the crankshaft 103. To this end, the radially outer portion of the member 126 (namely the portion adjacent the receptacles 104b) can be configured to extend axially of the torque converter 101 and away from the crankshaft 103.

The receptacles 104b are provided with circumferentially spaced-apart axially extending lobes 104c which are affixed to the housing 104a. In addition to or in lieu of such lobes 104c, the connection between the receptacles 104b and the housing 104a can be constructed and designed in such a way that, in accordance with a desirable aspect of the invention, it need not employ discrete fasteners (such as the lobes 104c); instead, the housing 104a can be provided with separately produced embossed portions 104d which together constitute a cam ring affixed to the housing and such cam ring can be provided with teeth, profiled portions, Hirth gears or serrations and/or pins. This renders it possible to dispense with the fastener means 126b. Moreover, such design (which can be employed with advantage in all or nearly al types of torque converters) renders it possible to simplify the mounting of the torque converter 101 on the flexible torque transmitting member 126 during the final stage of assembly of the power train of a motor vehicle.

The member 126 can be mounted on the housing 104a in such a way that it stores energy and the axial torque of the torque converter is preferably applied in a direction toward the transmission case (not shown) or toward the transmission input shaft 107 by way of an abutment which is or which can be mounted in a bearing. The form-locking connection between the member 126 and the housing 104a can be designed in such a way that it automatically orients itself during the assembly while the connection is being established.

It is clear that the lobes 104c can be made of one piece with the member 126, e.g., by folding partially separated lugs of the member 126 over themselves. In addition, the fasteners 126b and/or the receptacles 104b and/or the starter gear 126a can serve as auxiliary masses which positively influence the torsional vibration behavior of the power train by resorting to the so-called dual masses effect.

It is also possible to omit the member 126 and to establish a direct form-locking connection between the housing 104a and the crankshaft 103. For example, the crankshaft 103 can be made of one piece with or can carry a hardened extension having a diameter less than that of the member 126 and being located at the same radial distance from the axis X—X as the fasteners 103b. Such hardened extension can be affixed direztly to a complementary portion of the housing 104a (e.g., to a stamped portion of the housing) to thus establish a form-locking connection. The form-locking connection can be configured in such a way that it can simultaneously compensate for an offset between the crankshaft 103 and the transmission input shaft 107. The housing 104a can be axially flexible between its periphery and the form-locking connection, e.g., by employing a sheet metal having varying thicknesss in the region of such connection.

An important advantage of the form-locking connection is to serve as a noise reducing or noise damping arrangement, and such noise-reducing effect can be enhanced by providing the relevant parts with suitable coatings made of one or more metals, alloys, plastics or ceramics. Still further, it is possible to employ between the parts of the form-locking connection one or more energy storing elements in the form of springs, inserts made of rubber and the like.

The housing 104a and the pump 105 of the torque converter 101 are form-lockingly connected to each other, as at 105a, to constitute the input element of the torque converter 101. As can be seen in FIG. 2, the form-locking connection 105a can comprise several equidistant parts (FIG. 2 shows three parts) disposed at the periphery of the pump 105 and each including a male part provided on the pump 105 and extending into a complementary female part of the housing 104a.

That end portion (104e) of the housing 104a which is remote from the member 126 (as seen in the direction of the axis X—X ) constitutes a sleeve surrounding an axially projecting tubular extension 108a of the transmission. The extension 108a is sealingly surrounded by the sleeve 104e and is also surrounded by the freewheel 111 for the stator 110.

The pump 105 and the turbine 106 are provided with customary vanes or blades (not shown) which cooperate to ensure that the body of hydraulic fluid in the housing 104a rotates the turbine 106 in response to rotation of the pump 105 by the crankshaft 103. The (optional) stator 110 is disposed between the pump 105 and the turbine 106 (as seen in the direction of the axis X—X) and is radially outwardly adjacent the freewheel 111.

The turbine 106 is non-rotatably connected with a hub 106a, e.g., by an annular array of rivets, and this hub is non-rotatably but axially movably affixed to the transmission input shaft 107. An annular seal 107a is interposed between the shaft 107 and the hub 106a, and the latter abuts a thrust bearing 110b which, in turn, abuts the stator 110.

The hub 106a has an axial extension surrounded by the radially innermost portion of the axially movable piston 116 which forms part of the torque converter bypass clutch 113. An annular seal 106c is inserted between the piston 116 and the hub 106a; the latter has a disc-shaped extension 106b which extends radially outwardly and is riveted to the turbine 106. The extension 106b further serves as a stop which determines the extent of rightward axial movement of the piston 116 of the bypass clutch 113.

The piston 116 cooperates with the radial wall 104 of the housing 104a to transmit torque from the crankshaft 103 (via wall 104) directly to the hub 106a (i.e., to the transmission input shaft 107), namely to bypass the pump 105 and the turbine 106, when the bypass clutch 113 is engaged (with or without slip). More specifically, the piston 116 carries a friction lining 115 (or has a properly finished friction surface) which engages a complementary friction lining or friction surface 114 of the wall 104 when the clutch 113 is at least partly engaged. If used, the friction lining or linings (such as 115 and/or 114) can be glued, riveted and/or otherwise affixed to the piston 116 and/or to the wall 104. Certain presently preferred embodiments of the fluid flow regulating or limiting arrangement 122 of the bypass clutch 113 or an analogous bypass or lockup clutch will be described in greater detail with reference to FIGS. 9 to 13.

The piston 116 divides a part of the interior of the housing 104a into plenum chambers 117, 118 which are sealed from each other (when the bypass clutch 113 is engaged, either entirely or with slip) to the extent determined by the flow regulating arrangement 122. Hydraulic fluid is admitted into the plenum chamber 118 by way of a conduit 119a which is defined by an annular clearance between the sleeves 104e and 108a. A conduit 107b which serves to permit hydraulic fluid to issue from the chamber 117 is a bore in the transmission input shaft 107 which discharges into an annular passage 119b of the shaft 107. The sleeve 108a and the shaft 107 are sealingly engaged by a friction bearing 108*b* which serves as a means for sealing the passage 119*b* from the surrounding atmosphere; in addition, the combined bearing element and seal 108*b* prevents the flow of hydraulic fluid from the conduit 119*a* into the chamber 118.

When the fluid pressure in the plenum chamber 118 rises above that in the plenum chamber 117, the piston 116 is moved axially and the friction generating device 121 including the frictionally engageable members 114, 115 having friction surfaces 114', 115' establishes a frictional engagement to transmit torque from the wall 104 of the housing 104*a* to the piston 116.

If the fluid pressure in the chamber 117 thereupon rises above that in the chamber 118, the surfaces 114', 115' become separated from each other so that the bypass clutch 113 ceases to transmit torque; the transmission of torque from the crankshaft 103 to the transmission input shaft 107 then takes place by way of the housing 104*a*, pump 105, fluid between the pump 105 and the turbine 106, and the turbine hub 106*a*.

When the bypass clutch 113 is fully or partly, engaged (i.e., when it operates without slip or with some slip), the piston 116 continues to transmit at least some torque to the hub 106*a*. Vibrations of such torque can be damped by a damper 123 which operates between the piston 116 and the hub 106*a*. The damper 123 includes an input member 123*a* which is non-rotatably affixed to the piston 116, and an output member 123*b* non-rotatably affixed to the hub 106*a*. The input member 123*a* comprises two discs which flank the disc-shaped output member 123*b*. The discs of the input member 123*a* are shown as being riveted to the piston 116. The disc of the output member 123*b* is non-rotatably but axially movably mounted on the hub 106*a*; to this end, the member 123*b* has one or more axially parallel internal teeth mating with external teeth of the hub 106*a*. One or more energy storing elements 123*c* (one shown FIG. 2) yieldably oppose angular movements of the input and output members 123*a*, 123*b* relative to each other; to this end, the energy storing element(s) 123*c* reacts or react against one or more abutments provided on the input member 123*a* and bear upon one or more abutments on the output member 123*b*. Reference may be had, for example, to commonly owned U.S. Pat. No. 5,860,863 granted Jan. 19, 1999 to Friedmann et al. for "APPARATUS FOR DAMPING VIBRATIONS". The torsional vibration damper 123 is further provided with suitable means for limiting the extent of angular movability of the input and output members 123*a*, 123*b* relative to each other; such limiting means can provide first and second stops which are respectively mounted on or made of one piece with the members 123*a*, 123*b*.

It is further possible and often advisable to provide a slip clutch 123*d* which operates between the input and output members 123*a*, 123*b* and permits such members to turn relative to each other only when the torque being transmitted by the input member 123*a* rises to a predetermined value. The illustrated slip clutch 123*d* acts axially between the members 123*a*, 123*b* and can comprise one or more energy storing devices.

The wall 104 of the housing 104*a* of the torque converter 101 carries a centering stub 104*f* which extends into a recess 103*c* of the crankshaft 103. The stub 104*f* is welded to the wall 104 and is centered thereon by a projection 104*g* which is a stamped out part of the wall 104; however, it is also possible to make the stub 104*f* of one piece with the wall 104. The just described combined centering and torque transmitting means can serve to compensate for eventual angular and/or axial misalignments of the shaft 103 and the transmission input shaft 107 relative to each other.

The aforementioned axial projections 103*a* of the crankshaft 103 are preferably profiled and dimensioned in such a way that they facilitate the insertion of the stud 104*f* into the opening or recess 103*c* during mounting of the torque converter 101 on the output shaft 103 of the prime mover.

The projection 104*g* can further serve to facilitate accurate mounting (e.g., welding) of the stub 104*f* on the wal 104, particularly to accurately center the stud. The latter need not be a solid body but can be replaced with a tube or sleeve. Moreover, welding of the stub 104*f* to the wall 104 (as actually shown in FIG. 2) is optional, i.e., it can be replaced by riveting or the like.

It can be said that the stub 104*f* forms part of a pilot bearing which ensures simple, predictable and accurate mounting of the torque converter 101 on the output shaft 103 of the prime mover; such pilot bearing can be utilized with advantage in many other types of torque converters, clutches and the like. Furthermore, a similar or analogous or at least substantially identical pilot bearing can be utilized for accurate and reliable mounting of the transmission input shaft 107 in the torque converter 101 and/or in the crankshaft 103. For example, the front end portion of the shaft 107 can be received in a sleeve-like central part of the housing 104*a* of the torque converter 101. The housing 104*a* can be provided with a projection similar to or analogous to the projection 104*g* and extending into a sleeve-like member which, in turn, receives the front end portion of the transmission input shaft 107.

Figure 3:
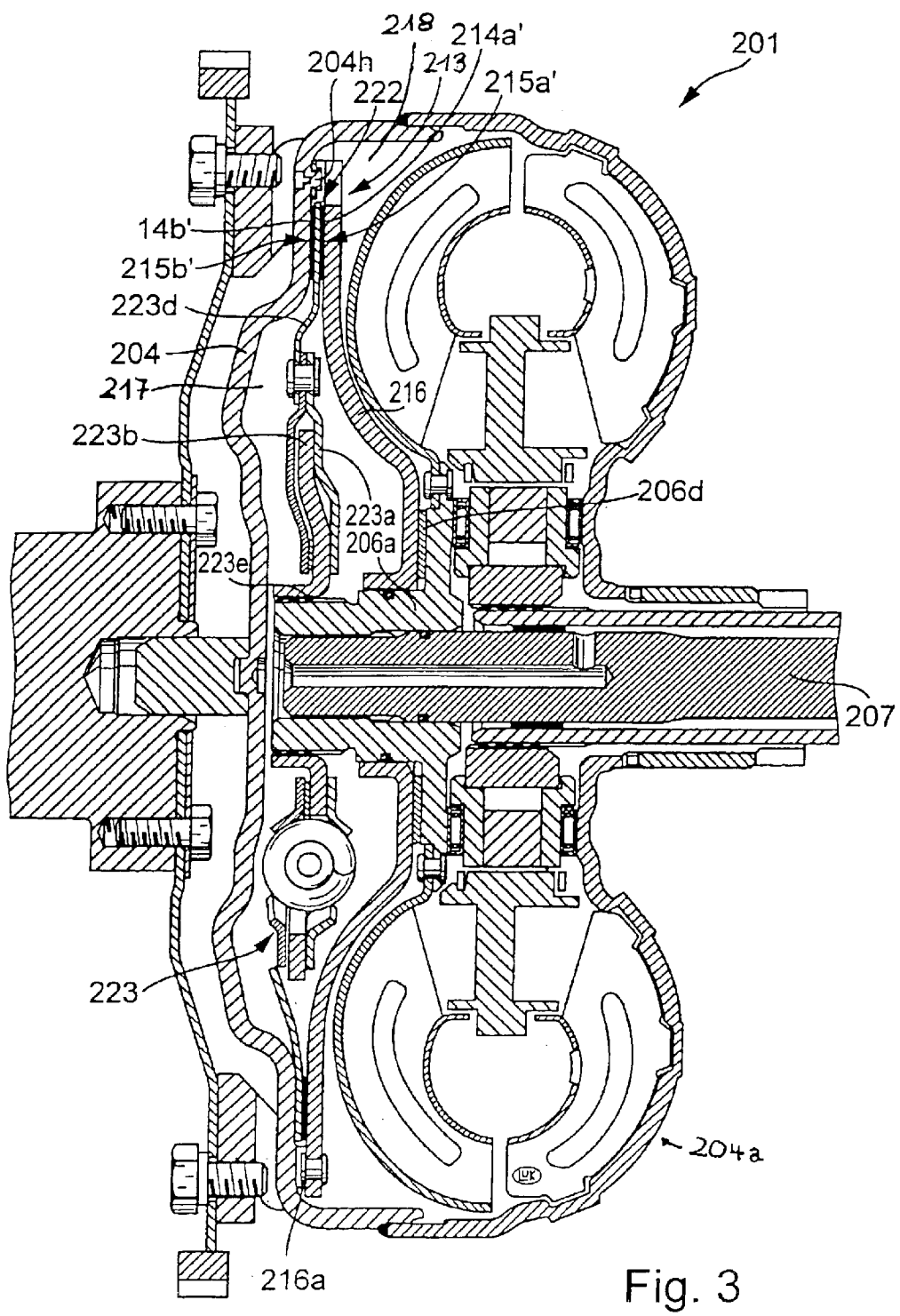
FIG. 3 is a similar axial sectional view of a hydrokinetic torque converter constituting a first modification of the apparatus shown in FIG. 2.

FIG. 3 is an axial sectional view of a torque converter 201 which differs from the torque converter 101 of FIG. 2 primarily in the design of the bypass clutch or lockup clutch 213. Thus, the radially outermost portion of the piston 216 of the clutch 213 is non-rotatably but axially movably secured to the radial wall 204 of the housing 204*a*. A feature of the piston 216 (this feature can be embodied in the pistons of all or nearly all bypass clutches for torque converters) is that the radially outermost portion of the piston carries leaf springs 216*a* which are affixed to the housing 204*a*. The leaf springs 216*a* are spaced apart from each other (as seen in the circumferential direction of the piston 216), one end portion of each leaf spring 216*a* is affixed to the housing 204*a*, and the other end portion of each such leaf spring is secured to the piston 216 of the bypass clutch 213. The leaf springs 216*a* are preferably riveted to the wall 204; to this end, the wall 204 is provided with wart-like projections or protuberances 204*h*. However, it is also possible to provide such or similar protuberances on the piston 216.

The piston 216 is turnable on a hub 206*a* which surrounds the input shaft 207 of the transmission. A thrust bearing 206*d* is interposed between the hub 206*a* and the piston 216; the illustrated bearing 206*d* is a disc which is installed between a radially outwardly extending portion of the hub 206*a* and the adjacent radially extending annular portion of the piston 216.

When the bypass clutch 213 transmits torque (i.e., when the piston 216 rotates with the wall 204 with or without slip), the transmission input shaft 207 receives torque by way of the input member 223*a* of the torsional vibration damper 223 which frictionally engages the output member 223*b*. The latter is non-rotatably but axially movably mounted on the hub 206*a*. The input member 223*a* is riveted or otherwise affixed to a friction lamella 223*d* the radially outermost portion of which carries two friction linings having friction surfaces 214*a*', 214*b*' disposed radially inwardly of the projections 204h. The linings having the surfaces 214a', 214b' are respectively adjacent to complementary friction linings having friction surfaces 215a', 215b'.

The output member 223b of the damper 223 is non-rotatably secured to the hub 206a by annuli of mating teeth 223e. The reliability of such connection is enhanced by providing the radially innermost portion of the output member 223b with a sleeve having axially parallel internal teeth in mesh with complementary teeth of the hub 206a.

The torsional vibration damper 223 is similar to (or can be identical with) the damper 123 shown in FIG. 2.

The bypass clutch 213 is designed to transmit torque by way of two friction linings, i.e., it provides a larger composite friction surface than the bypass clutch 113 of FIG. 2. This can be of advantage in that the clutch 213 is capable of transmitting larger torques or of transmitting torques similar to those transmittable by the clutch 113 but with smaller friction surfaces; the latter feature is important when it is desirable or necessary to reduce the dimensions of the bypass clutch.

The fluid flow regulator 222 can be provided on (or can utilize) the friction linings having the surfaces 214', 215' and/or 214b', 215b'. Presently preferred embodiments of such regulator are depicted in FIGS. 22 to 25.

Figure 4:
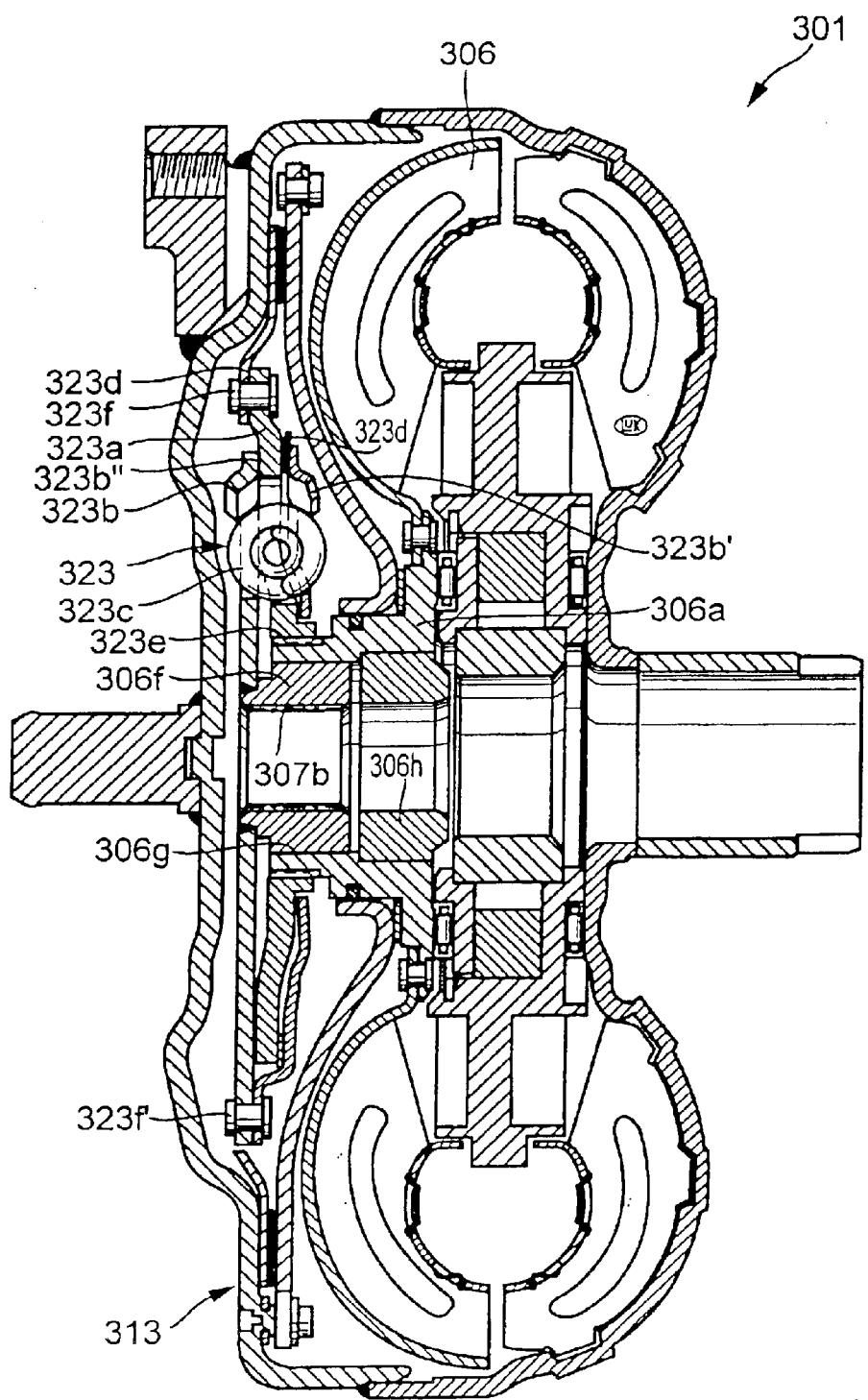
FIG. 4 is an axial sectional view of a hydrokinetic torque converter which constitutes a second modification of the apparatus shown in FIG. 2.

FIG. 4 shows certain features of a hydrokinetic torque converter 301 which is similar to the torque converter 201 of FIG. 3. The prime mover and the transmission are not shown in FIG. 4. The main difference between the torque converters 201 and 301 is that the latter employs a different bypass clutch 313 and a different torsional vibration damper 323. In accordance with a feature of the invention which is embodied in the torque converter 301, the torsional vibration damper 323 serves as a turbine damper as well as a means for damping vibrations being transmitted by the by pass clutch 313. To this end, the input 323a of the damper 313 is non-rotatably secured to the hub 306a for the turbine 306 (this turbine is non-rotatably secured to the hub 306a) as well as to the friction lamella (energy storing device) 323d. Thus, the input 323a of the damper 323 can receive torque from the turbine 306 as well as from the bypass clutch 313.

The input 323a of the damper 323 is form-lockingly secured to the hub 306a by annuli of mating teeth 323e, and the lamella 323d is fixedly secured (e.g., by rivets) to the input 323a radially outwardly of the energy storing elements 323c. The hub 306a is free to rotate relative to the input shaft (not shown) of the transmission; to this end, a discrete hub portion 306f is provided with internal teeth 307b mating with complementary teeth of the transmission input shaft. The hub 306a is rotatable on the discrete hub portion 306f, preferably in a friction bearing 306g or on an anti-friction bearing (not shown) which surrounds the discrete hub portion 306f.

The output 323b of the damper 323 is fixedly secured to the discrete hub portion 306f, e.g., by welding (such as laser, impulse or spot welding) or by caulking.

In order to facilitate broaching of the teeth 307c, there is provided a discrete hub portion or member 306h which can be received in the hub 306a; e.g., the hub 306a can be a press fit on the discrete member 306h and is also mounted on the transmission input shaft. The latter can be provided with bearings rotatably mounting the member 306h.

Damping of torsional vibrations is effected by causing the input 323a of the damper 323 to turn relative to the output 323b and/or vice versa against the opposition of the energy storing element(s) 323c as well as by overcoming (a) the resistance of a friction generating device 323d between an axially effective energy storing element 323b' sand the input 323a and/or (b) the friction torque of the friction bearing 306g and/or preferably a slip clutch 323b". The lateral part 323b' is connected with the output 323b by an annulus of rivets 323f and cooperates with the output 323b to confine the input 323a; the radially outer portion of the input 323a is secured to the lamella 323d by rivets 323f. The input 323a is disposed between the output 323b and the lamella 323d; these parts are provided with at least partially registering windows for the energy storing element(s) 323c each of which can include a single coil spring or two or more suitably interfitted coil springs. The output 323b and the lamella 323d are or can be provided with suitable stops (not referenced) which determine the maximum compression of the coil spring(s) and the maximum extent of angular movability of the input 323a and the output 323b of the torsional vibration damper 323 relative to each other.

Figure 5:
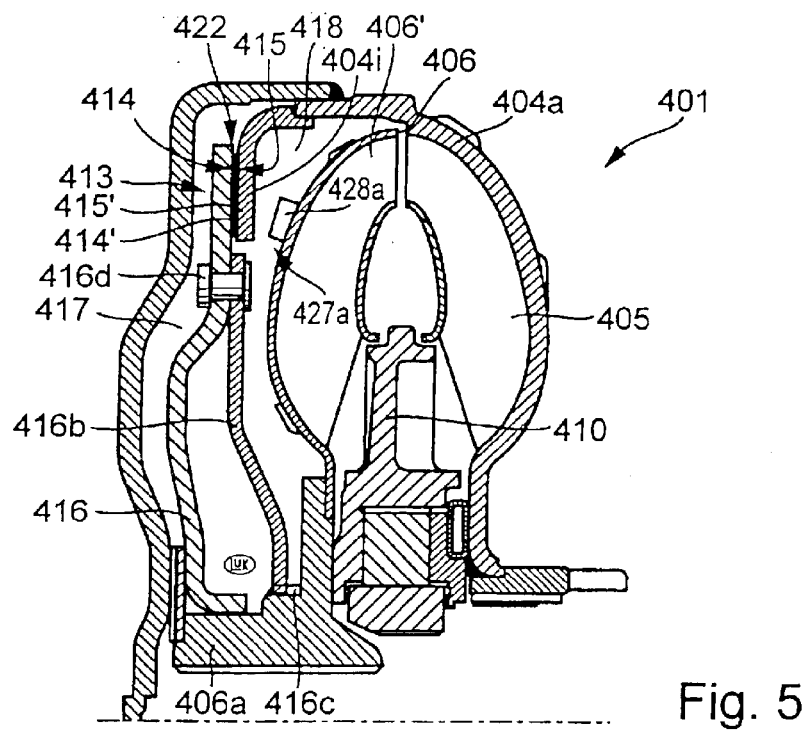
FIG. 5 is a fragmentary axial sectional view of a further torque converter.
Figure 6:
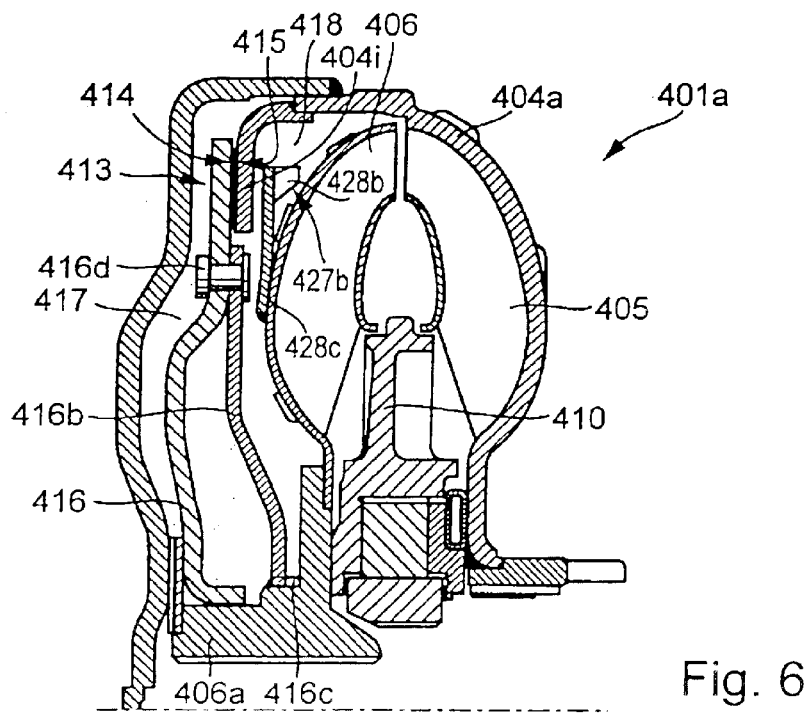
FIG. 6 is a similar fragmentary axial sectional view of a torque converter constituting a modification of the apparatus shown in FIG. 5.

FIGS. 5 and 6 respectively illustrate parts of torque converters 401 and 401a which are similar to but not identical with each other. All such parts of these torque converters which are plainly identical with each other are denoted by identical reference characters. The housing 404a of each torque converter is driven by a prime mover (e.g., a combustion engine, not shown) and transmits torque to the respective pump 405. The latter can drive the turbine 406 which cooperates with the pump to flank an optional stator 410. The bypass clutch 413 can be engaged to transmit torque (with or without slip) from the washer-like annular part 404i of the housing 404a directly to the hub 406a non-rotatably surrounding the input shaft (not shown) of the change-speed transmission in the power train of a motor vehicle. An entraining disc 416b is riveted to the piston 416 of the bypass clutch 413 and is axially movably but non-rotatably mounted on the hub 406a. The disc 416b is provided with an annulus of axially parallel internal teeth 416c mating with complementary external teeth of the hub 406a. The connection between the piston 416 and the disc 416b comprises an annular array of rivets 416d (only one shown in each of FIGS. 4 and 5).

In accordance with a modification, the disc 416b in each of the torque converters 401 and 401a can be replaced with a torsional vibration damper having an input and an output which can be turned relative to each other against the resistance of one or more coil springs or other suitable energy storing elements and/or against the opposition of one or more slip clutches. The input and/or the output of the device which replaces the disc 416b of the torque converter 401 or 401a can consist of several laminations, and the input can be further affixed to the turbine 406 (in addition to or instead of the connection to the disc 416b) or to a part which shares the angular movements of the turbine.

Frictional engagement between the piston 416 (driven part) and the housing 404a (driving part) can be established by the cooperating friction generating members 414 and 415, and more specifically by the friction surfaces 414', 415' of the respective members. The driving member 414 receives torque from the aforementioned washer-like portion 404i of the housing 404a. The portion 404i has an annular part which is welded to the major part of the housing 404a (namely to the part which carries or is of one piece with the pump 405) and extends toward the prime mover (not shown), and a radially inwardly extending part which bears the member 415. The member 414 is affixed to the radially outermost portion of the piston 416. At least one of the members 414, 415 can constitute or comprise at least one friction lining having the respective one of the friction surfaces 414', 415'.

The reference character 422 denotes the fluid flow regulator which, in certain parts of this specification, is denoted by the character x22 wherein x denotes the respective Figure of the drawings. This regulator corresponds to the previously described regulators (such as the regulator 222 shown in FIG. 3). The washer-like member 404*i* replaces the walls 4, 104, 204, 304 respectively shown in FIGS. 1, 2, 3 and 4.

The mode of operation of the torque converter 401 or 401*a* departs from that of the torque converters 1, 101, 201 and 301 in the following respects: In the torque converters 401 and 401*a*, the pressurized fluid first flows into the plenum chamber 417 and the bypass clutch 413 is engaged when the pressure of fluid in the plenum chamber 417 exceeds that of fluid in the plenum chamber 418, i.e., when the fluid begins to flow through the fluid flow regulator 422. The bypass clutch 413 begins to transmit torque (with or without slip) when the pressure of fluid in the plenum chamber 417 reaches a level at which the bypass clutch 413 is at least partially engaged, i.e., when the piston 416 has moved axially toward the turbine 406 to a position in which the friction surfaces 414', 415' of the members 414, 415 frictionally engage each other so that the washer-like member 404*i* of the housing 404*a* (which is driven by the prime mover) begins to transmit torque to the hub 406*a* (and hence to the input shaft of the transmission) by way of the members 414, 415 and the piston 416.

The bypass clutch 413 remains at least partly engaged as long as the pressure of fluid in the chamber 417 at least slightly exceeds the pressure in the chamber 418. It is often desirable to employ at least one energy storing device which automatically disengages the bypass clutch 413 as soon as the pressure of fluid in the chamber 417 begins to decrease; for example, such device can include one or more coil springs or other suitable springs which react against the hub 406*a* and bear upon the piston 416 in a direction to move the piston axially to the left, as viewed in FIGS. 5 and 6. An advantage of such energy storing device or devices is that they reduce the likelihood of overheating of the fluid (such as oil or a transission fluid) which fills the chambers 417, 418 and is likely to be heated during prolonged operation of the bypass clutch 413 with slip, i.e., during that stage of operation of the clutch 413 when the fluid is caused to flow gradually through the fluid flow regulator 422 from the chamber 417 into the chamber 418. It is to be borne in mind that, in many instances, the fluid which fills the chambers 417, 418 is circulated through the transmission and is likely to adversely affect the heat-sensitive part(s) of the transmission if it is permitted to reach an elevated temperature during flow through the regulator 422 at a rate which is customary during operation of the clutch 413 with slip. The situation is different if the fluid leaving the chamber 418 is caused to enter an evacuating conduit which causes the heated fluid to flow through one or more fluid cooling units (hea exchangers). Such cooling unit(s) can be dispensed with if the fluid leaving the chamber 417 is caused to mix with the body of cooler fluid in the chamber 418 prior to entering the transmission.

It is equally within the purview of the invention to convey the fluid through one or more cooling units prior to entry into the chamber 417, i.e., to ensure that the parts 414, 415 of the regulator 422 are invariably contacted by a relatively cool fluid which passes through the regulator 422 in small or relatively small quantities.

The torque converters 401, 401*a* respectively comprise fluid cooling units 427*a*, 427*b* of the type adapted to be utilized with advantage in the previously described torque converters 1, 101, 201 and 301 as well as in many other types of torque converters. The purpose of the cooling units is to agitate the fluid in the plenum chamber 418 adjacent the washer-like member 404*i* of the housing 404*a*. Such agitation takes place as soon as or as long as the parts 406 and 404*i* turn relative to each other. Analogous results can be obtained by installing one or more cooling units in positions in which they become active as soon as the piston and the turbine begin to perform angular movements relative to one another.

The cooling unit 427*a* of FIG. 5 comprises an annular array of blades or vanes 428*a* which are mounted on or form part of the turbine 406 and are arranged to orbit adjacent the member 404*i* of the housing 404*a*. For example, the blades 428*a* of the cooling unit 427*a* can constitute separately produced parts which are riveted, welded and/or otherwise reliably affixed to the turbine 406. The blades 428*a* of the cooling unit 427*a* can also perform one or more additional functions, such as of securing the customary turbine vanes 406' to the turbine 406; the blades 428*a* can form suitably deformed integral lugs or analogous parts of the turbine 406.

When the cooling unit 427*a* is in actual use, the blades 428*a* cause the fluid which is heated in the region of the fluid flow regulator 422 to flow away from the parts 414, 415 and to intensively mix with cooler fluid in those portions of the chamber 417 which are remote from the parts 414, 415. Moreover, the blades 428*a* cause the fluid (which has been heated by the parts 414, 415) to exchange heat with the portion 404*i* of the housing 404*a*. All such modes of preventing excessive localized heating of fluid at the regulator 422 contribute to prevention of overheating of the fluid in the chamber 417 as well as of fluid which issues from the chamber 417 to flow, for example, into the transmission of the power train employing the torque converter 401.

The cooling action of the cooling unit 427*b* in the torque converter 401*a* of FIG. 6 is analogous to that of the cooling unit 427*a* in the torque converter 401 of FIG. 5. The difference is that the blades 428*b* of the cooling unit 427*b* form part of a separately produced disc-shaped member 428*c* which is welded to the turbine 406 and is located in the plenum chamber 418. It is clear that the blades 428*b* can constitute separately produced parts which are welded, riveted or otherwise affixed to the member 428*c*. Again, the blades 428*b* are adjacent the portion 404*i* of the housing 404*a*, i.e., next to the members 414, 415 which are a cause of heating of fluid in the chamber 418 or on its way from the chamber 417 into the chamber 418.

Figure 7:
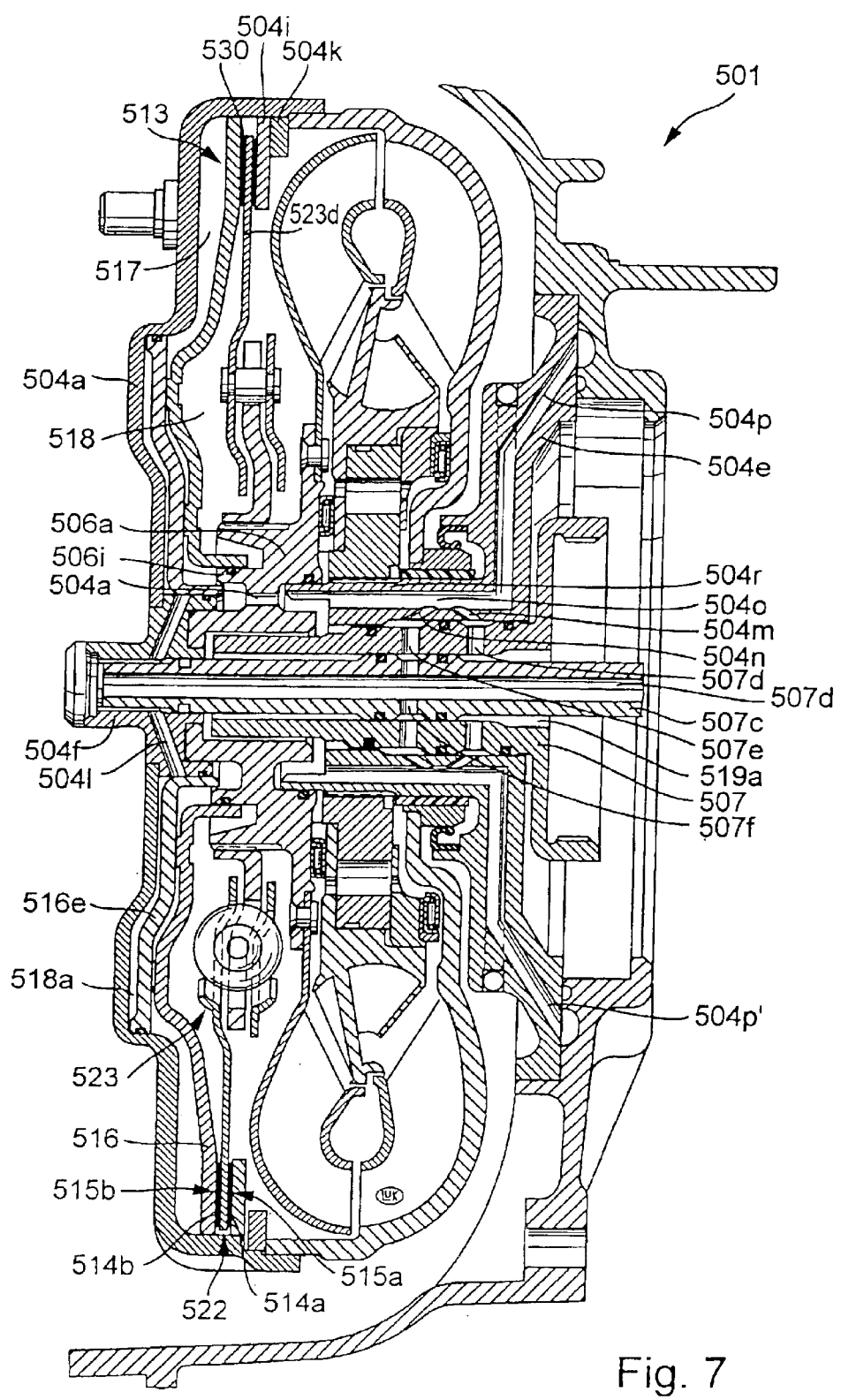
FIG. 7 is an axial sectional view of a further torque converter.

FIG. 7 shows a torque converter 501 wherein the rotary housing 504*a* comprises a hollow pin 504*f* having teeth meshing with the teeth of a hollow transmission input shaft 507. The latter receives torque from the prime mover (not shown) by way of the torque converter 501. The pin 504*f* has an axial extension which non-rotatably but axially movably supports an auxiliary piston 516*e* having a radially outermost portion in sealing engagement with the adjacent axially extending tubular part of the housing 504*a*. The thus obtained annular compartment 518*a* between the leftmost portion of the housing 504*a* and the auxiliary piston 516*e* can receive fluid to effect an axial movement of the auxiliary piston in a direction to the right, as viewed in FIG. 7.

The auxiliary piston 516*a* abuts the axially movable piston 516 of the bypass clutch 513. The piston 516 is mounted on an extension or projection 506*i* of a hub 506*a* which is movable axially of but cannot rotate relative to the transmission input shaft 507. The piston 516 constitutes or is connected with a discrete output member of the torque converter 501; for example, the discrete output member can be welded (such as spot welded), riveted and/or otherwise non-rotatably affixed to the piston 516 so that it shares all axial movements of the latter.

The driving part is constituted by a washer-like member 504i which is non-rotatably (such as form-lockingly) connected with the housing 504a and is held against axial movement by an abutment or stop 504k. The member 504i extends radially inwardly from the radially outer or outermost portion of the housing 504a. The form-locking connection is or can be established by a profiled (such as toothed) external surface which is provided on the member 504i and mates with a complementary (e.g., put through) internal surface of the adjacent portion of the housing 504a. Frictional engagement involves a lamella 523d by way of friction surfaces 514a, 514b, 515a, 515b. The friction surfaces 514a, 514b can be provided on the friction linings which are preferably affixed to the lamella 523d and, in order to establish a connection, are provided with a channel 530, e.g., a pattern or array of grooves. The lamella 523d is non-rotatably but axially movably mounted on the hub 506a radially outwardly of the piston 516, and preferably coaxially with the latter, by way of a torsional vibration damper 523 analogous to the damper 223 shown in and already described with reference to FIG. 3.

When the bypass clutch 513 is at least partially engaged, the piston 516 cooperates with the friction surfaces 514a, 514b, 515a, 515b to establish a fluid flow limiting or regulating arrangement 522 which determines the rate of fluid flow between the plenum chambers 517 and 518. In order to engage the bypass clutch 513, the compartment 518a receives hydraulic fluid at a pressure higher than that in the chamber 518; on the other hand, the pressure of fluid in the compartment 518a is reduced below that in the chamber 518 if the clutch 513 is to be disengaged. The compartment 518a receives fluid from a source (not shown) by way of a bore or channel 504p provided in a pipe 504e of the stator. The channel 504p communicates with a radial bore 504n which, in turn, communicates with bores 507e, 507f respectively provided in the transmission input shaft 507 and the additional shaft 507c. The latter has an axial passage or bore or channel 507d which communicates with one or more radial bores 5041 discharging into the compartment 518a.

In the embodiment of FIG. 7, the admission of pressurized fluid into the compartment 518a is preferably independent of the fluid flow through the fluid flow regulating arrangement 522, i.e., the flow of fluid through the plenum chambers 517, 518 can take place independently of the pressure of fluid in the compartment 518a. The direction of fluid flow in and the sequence in which the chambers 517, 518 receive fluid depends upon the intended use and/or mode of operation of the torque converter 501 shown in FIG. 7.

In the embodiment which is shown in FIG. 7, the plenum chamber 517 is first to receive pressurized fluid; the admission of fluid into the chamber 517 takes place by way of a second conduit 504p' in the stator, an axial bore 504o in the non-rotatable stator pipe 504e, and at least one axially parallel bore 504q in the hub 506a. The fluid which leaves the chamber 517 enters the chamber 518 by way of the array of grooves 530 at the fluid flow regulating arrangement 522. The fluid which leaves the chamber 518 enters an evacuating conduit (not shown) provided in the stator pipe 504 by way of the chamber 517, grooves 530, compartment 518a and an opening 504r.

The stator pipe 504e and the transmission input shaft 507 are respectively provided with openings 504m, 507d which supply hydraulic fluid to the transmission, e.g., to the torque sensor of a continuously variable transmission (CVT), by way of at least one of additional conduits 504p, 504p', 519a between the shaft 507c and the input shaft 507. It will be appreciated that certain bores, openings, channels and like fluid path establishing passages which are referred to hereinabove and at least some of which are shown in FIG. 7 must be temporarily, intermittently or permanently sealed from each other in order to establish paths for the flow of fluid to and from selected chambers and/or compartments during different stages of operation of the torque converter 501. The aforementioned CVT can be of the type disclosed in any one of a number of US and foreign patents owned by the assignee of the present application, for example, in U.S. Pat. No. 5,711,730 granted Jan. 27, 1998 to Friedmann et al. for "TORQUE MONITORING APPARATUS" and in the U.S. patents referred to in this patent to Friedmann et al.

It is further clear that the additional or auxiliary piston 516e and the compartment 518a can be utilized with advantage in numerous torque converters other than those specifically described and shown in the present case, i.e., in torque converters not employing a fluid flow regulating arrangement 522 (or an equivalent thereof) and/or an auxiliary drive. The required arrangements of conduits, channels, bores, holes and/or analogous paths for the flow of fluid will be selected in dependency upon the specific requirements of the modified torque converters. Furthermore, the flow of fluid from the various embodiments of the improved torque converter can be limited and/or otherwise regulated by specially designed and/or mounted valves. For example, a fluid flow regulating arrangement (such as the one shown at 522 in FIG. 7) can employ a valve which regulates the flow of pressurized fluid in dependency upon the temperature of such fluid, e.g., in such a way that, when the temperature of fluid rises while and/or because the bypass clutch operates with slip, the rate of fluid flow is increased. To this end, the valve need not or should not be disposed in immediate or close proximity to the regulator 522; for example, it often suffices to install a thermometer next to the regulator 522 and to utilize the thermometer as a means for transmitting signals to a fluid flow regulating valve which can be installed at a location close to or remote from the bypass clutch and from the fluid flow regulator.

Figure 8:
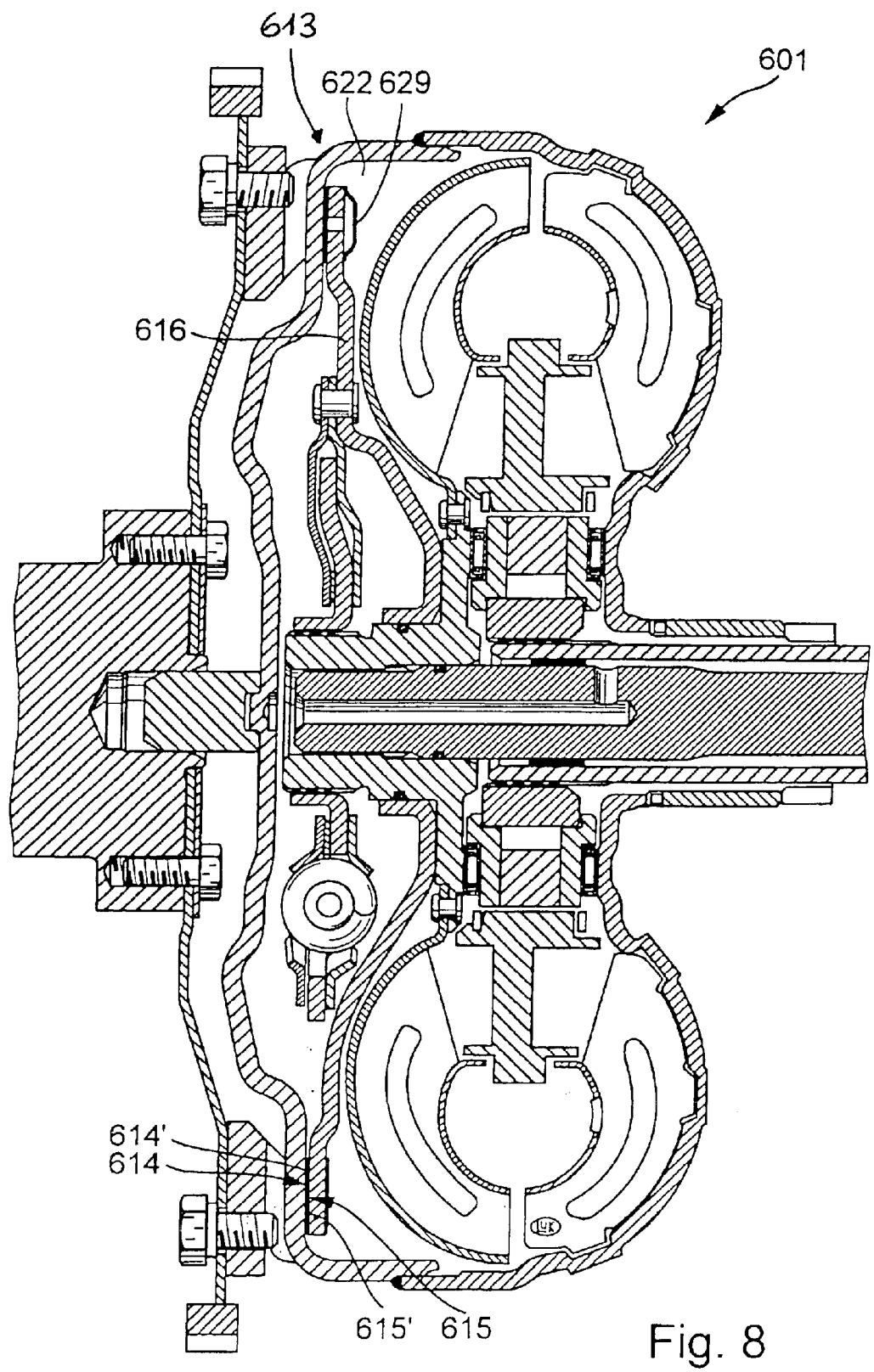
FIG. 8 is a similar axial sectional view of an additional hydrokinetic torque converter.

FIG. 8 illustrates certain details of a torque converter 601 which constitutes a modification of the torque converter 101 shown in FIG. 2. The piston 616 of the bypass clutch 613 in the torque converter 601 differs from the piston 116 in order to establish a modified fluid flow regulating arrangement 622. Furthermore, the torque converter 622 employs modified friction generating members 614, 615 respectively having friction surfaces 614', 615'. Such constituents of the arrangement 622 will be described in full detail with reference to FIGS. 16a and 16b. The piston 616 has a circumferentially distributed annulus of resilient pressure transmitting components 629; these parts will be fully described and their function explained with reference to FIGS. 14 and 15.

Figures 9, 10, 11, 12:
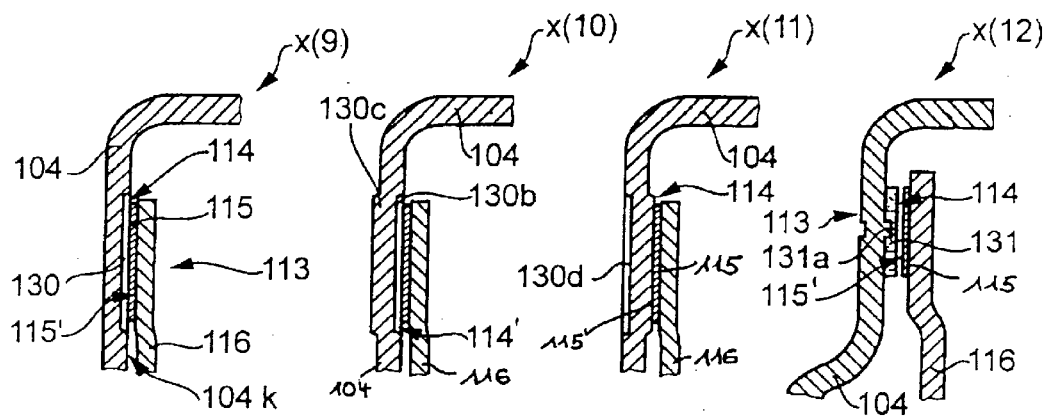
FIG. 9 is a fragmentary axial sectional view of a novel bypass clutch which can be utilized in torque converters and includes a specially designed portion of the converter housing.
FIG. 10 is a similar fragmentary axial sectional view of a bypass clutch constituting a first modification of the bypass clutch shown in FIG. 9.
FIG. 11 is a similar fragmentary axial sectional view of a bypass clutch constituting a second modification of the clutch shown in FIG. 9.
FIG. 12 is a similar axial sectional view of a bypass clutch constituting a third modification of the clutch shown in FIG. 9.

FIGS. 9 to 13a illustrate four presently preferred embodiments x(9), x(10), x(11) and x(12) of the improved fluid flow regulating arrangement, and more specifically four embodiments of the arrangement 122 shown in FIG. 2. In FIG. 9, the piston 116 of the bypass clutch 113 cooperates with the radial wall 104 of the torque converter housing to regulate the flow of hydraulic fluid between the plenum cambers 117, 118 (refer to FIG. 2) when the bypass clutch 113 is engaged. The wall 104 has a cooling surface 104k which confronts the piston 116 and is provided with radially extending grooves or channels 130; such grooves can be impressed into the surface 104k of the wall 104. The non-depressed portions of the cooling surface 104k (i.e., the radially extending surfaces alternating with the grooves 130 constitute one friction surface 114' of the arrangement 122, and an annular friction lining 115 on the radially outermost portion of the piston 116 defines a second friction surface 115' which bears upon the friction surface 114' when the clutch 113 is at least partly engaged. At such time, hydraulic fluid can flow only through the grooves 130 when the pressure of such fluid in the chamber 117 exceeds that of fluid in the chamber 118.

The quantity of fluid flowing from the chamber 117 into the chamber 118 depends upon the pressure differential between the fluid bodies in these chambers as well as upon the combined cross-sectional area of unobstructed portions of the grooves 130. In other words, such rate of fluid flow is dependent upon several parameters including the pressure differential between the fluid bodies filling the chambers 117, 118, the total number of grooves 130, the extent to which the flow of fluid through these grooves is permitted by the friction surfaces 114', 115', and the depths, widths and lengths of the grooves (these grooves are assumed to have but need not have identical dimensions).

Another factor which influences or determines the rate of fluid flow through the grooves 130 is the temperature (and hence the viscosity) of fluid leaving that one of the chambers 117, 118 wherein the fluid pressure is higher. The temperature of fluid rises as a result of friction moment developing at the surfaces 114', 115', i.e., the temperature of fluid being forced through the grooves 130 increases while the wall 104 and the piston 116 slip relative to each other because, at such time, the fluid exchanges heat with the surfaces surrounding the grooves, Such heating of the fluid entails a drop of viscosity, and the rate of flow of such fluid through the grooves 130 increases if the pressure in the chambers 117, 118 remain unchanged.

It will be seen that, by properly selecting the parameters of the grooves 130, one can achieve an optimal cooling of the surface. 114', 115' as well as an optimum rate of fluid flow between the chambers 117 and 118. It will also be seen that, in the embodiment which is shown in FIG. 9, the fluid flow regulating arrangement operates in dependency upon the extent of slip between the surfaces 114' and 115'. If necessary or desired, the parameters of the grooves 130 can be selected in such a way that one can achieve a desired cooling effect with a very high degree of accuracy. In other words, one can ensure that the operation of the bypass clutch 113 is at least substantially independent of changes of viscosity of the fluid.

Figure 13:
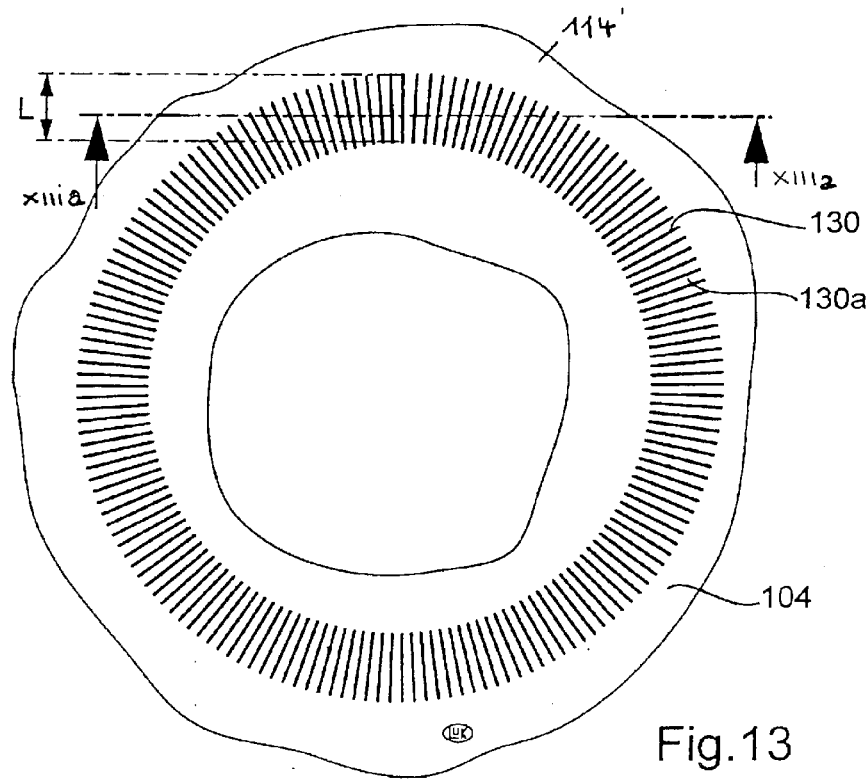
FIG. 13 is a smaller-scale elevational view of a portion of a hydrokinetic torque converter as seen from the right-hand side of FIG. 9 and illustrates the distribution of fluid conveying radial recesses or channels in the housing of the torque converter.
Figure 13A:
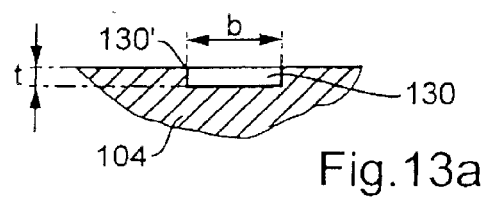
FIG. 13a is an enlarged fragmentary sectional view substantially as seen in the direction of arrows from the line XIIIa—XIIIa shown in FIG. 13.

In accordance with a presently preferred embodiment, the length l of the grooves 130 (as measured radially of the wall 104, i.e., at right angles to the plane of FIG. 13a and as shown in FIG. 13), is between 10 and 50 mm, most preferably between 10 and 30 mm. As shown in FIG. 9, the length of the grooves 130 can exceed the width of the friction lining 115; this is desirable and advantageous because such dimensioning of the lengths l of the grooves 130 and of the radial width of the friction lining 115 ensures a practically unimpeded inflow of fluid into and a practically unimpeded outflow of fluid from the grooves 130.

As concerns the hydrodynamic aspects, the important parameters include the length l (FIG. 13), the width b (FIG. 13a) and the depth t (FIG. 13a) of the grooves 130, especially the ratio of t to b. The edges 130' (see FIG. 13) of the surfaces bounding the grooves 130 may but need not be rounded. The width b of a groove 130 can be within the range of between about 0.2 and 20 mm, and the depth t can be less than 0.3 mm, preferably less than 0.15 mm. Still further, a groove 130 need not have an exactly rectangular cross-sectional outline; for example, the cross-sectional outlines of those end portions of the grooves 130 which are adjacent their radially outermost portions (at 130a in FIG. 13) can have a trapeziform cross-sectional outline with each groove becoming wider as seen in a direction from the bottom toward the surface 114' of the wall 104. The cross-sectional area of each groove 130 can increase radially outwardly toward the radially outermost portion 130a shown in FIG. 13.

Still further, each of the grooves 130 need not extend exactly radially of the wall 104; for example, at least some of these grooves can include portions extending exactly or substantially circumferentially of the wall 104. It is also possible to replace equidistant grooves 130 with grooves disposed at different distances from each other, as seen in the circumferential direction of the wall 104.

An advantage of grooves 130 which include portions extending radially and portions extending circumferentially of the wall 104 is that the rate of fluid flow through such grooves increases with increasing RPM of the wall 104.

The number of grooves 130 can vary within a wide range, e.g., between 8 and 400. It is presently preferred to provide the wall 104 with a substantial number of grooves, particularly between 100 and 300.

The making of grooves 130 in the surface 114' of the wall 104 can involve a pressing, erosion, milling or any other suitable material removing or material displacing technique. The groove 130 shown in FIG. 9 is assumed to have been impressed into the surface 114' of the wall 104.

FIG. 10 illustrates a portion of a modified fluid flow regulating arrangement x(10) wherein the grooves 130b are obtained by providing the wall 104 with radially extending rib-shaped projections 130c at that side which faces away from the piston 116 of the bypass clutch. Thus, the grooves 130b of FIG. 10 are obtained by displacing portions of the material of the wall 104 away from the piston 116, i.e., into the surface 114'.

FIG. 11 shows a portion of a fluid flow regulating arrangement x(11) which is the opposite of that shown in FIG. 10. Thus, the left-hand side of the wall 104 is provided with elongated grooves or recesses 130d which are obtained by depressing the material of the wall 104 toward the piston 116. Consequently, the grooves (not shown) at the surface 114 are flanked by ribs which project beyond the surface 114. In other words, the grooves in the wall 104 of FIG. 11 are obtained as a result of raising elongated radially extending rib-shaped portions of the material of the wall 104 toward the adjacent left-hand surface of the piston 116.

The making of the projections shown at the right-hand side of the wall 104 depicted in FIG. 11 can involve the use of a suitable tool or implement (not shown) having raised portions which impress the grooves or recesses 130d to thus provide the surface 114' with raised portions which, in turn, flank grooves having open sides facing the surface 115' of the friction lining 115 on the piston 116.

The fluid flow regulating arrangement x(12) of FIG. 12 does not employ any grooves in the surface 114' and/or 115'. Instead, that side of the wall 104 which confronts the piston 116 carries a continuous or composite annular layer 131 of a material which is permeable to the fluid filling the chambers 117, 118. The layer 131 can be made of or can contain a sintered substance, a porous ceramic material (e.g., porous glass), a temperature-resistant porous organic plastic material or the like. The surface 114' of such layer 131a cooperates with the surface 115' of the friction lining 115 on the adjacent surface of the piston 116.

FIG. 12 shows the bypass clutch which employs the permeable layer 131 in disengaged condition, i.e., the layer 131 is out of contact or not in sufficient contact with the surface 115' of the friction lining 115 on the piston 116. If the piston 116 is moved to the left so that the bypass clutch including the structure shown in FIG. 12 is engaged to operate with or without slip, the hydraulic fluid is forced to penetrate through the permeable layer 131 as soon as the pressure of fluid in one of the chambers 117, 118 exceeds the fluid pressure in the other chamber. Heat which develops as a result of frictional engagement between the exposed surface 114' of the layer 131 and the surface 115' of the friction lining 115 (while the bypass clutch operates with slip) is withdrawn by the flowing fluid. The rate of flow of fluid through the porous layer 131 depends upon the porosity of the material of such layer and the viscosity (temperature) of the fluid.

The layer 131 is secured to the wall 104 by rivets 131a (one shown in FIG. 12). Alternatively, the layer 131 can be secured to the wall 104 by a suitable adhesive, by projections provided on the wall 104 and extending into complementary recesses in the left-hand side of the layer 131, and/or in any other suitable manner. Furthermore, the layer 131 can be formed by applying to the wall 104 one or more films of a material which, when hardened or set, constitutes the layer 131.

It is clear that the porous layer 131 can be applied to the piston 116 and that the wall 104 can carry a friction lining 115 or bears directly upon the permeable layer on the piston 116. Still further, it is possible to provide two porous layers 131, one on the wall 104 and the other on the piston 116. It is also possible to provide the exposed side of the porous layer 131 with a friction lining which bears directly upon the adjacent surface of the piston 116 or upon a friction lining on the piston 116 when the bypass clutch embodying the structure of FIG. 12 or an analogous structure is at least partially engaged.

Figure 14:
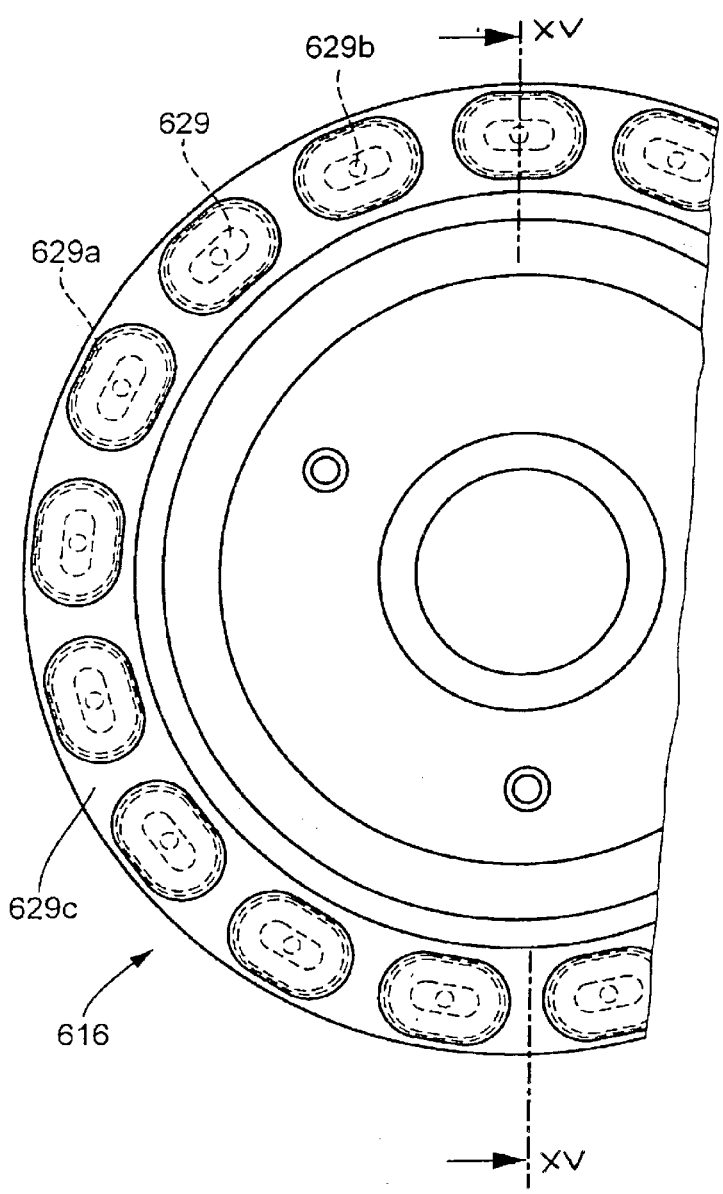
FIG. 14 is a fragmentary elevational view of the piston of a bypass clutch wherein the radially outermost portion of the piston carries an annular array of inflatable and deflatable bellows forming part of the cooling system.
Figure 15:
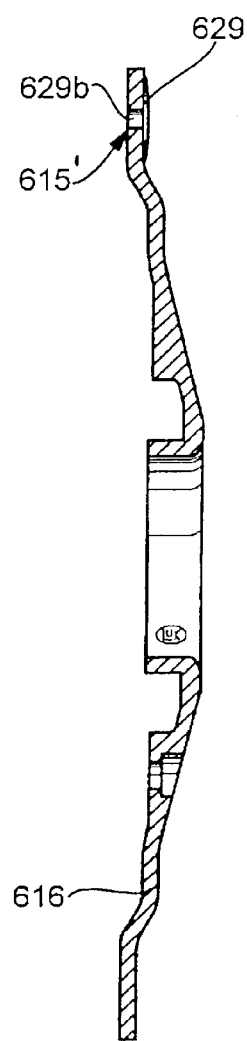
FIG. 15 is an axial sectional view of the piston as seen in the direction of arrows from the line XV—XV shown in FIG. 14.

FIGS. 14 and 15 illustrate the distribution of and the manner of mounting the resilient pressure transmitting members or components 629 one of which is shown in the upper part of FIG. 8. For the sake of simplicity, such components will be referred to as bellows since each thereof defines at least one internal space which can receive and discharge a quantity of fluid. As can be seen in FIG. 14, the piston 616 of the bypass clutch 613 carries an annular array of equidistant and rather closely adjacent oval bellows 629 each of which has its marginal portion affixed to the radially outermost portion of the piston 616 (as at 629a). The connections 629a can be established by an adhesive, by welding or in any other suitable manner.

For example, the bellows 629 can be made of a metal (such as a thin layer of sheet metal), of rubber or of any other suitable material which can perform the functions to be described hereinafter. The oval bellows 629 can be replaced with circular or otherwise configurated components.

The central portion of each bellows 629 registers with a discrete port 629a of piston 616; each such port permits hydraulic fluid to enter into or to issue from the respective bellows. The ports 629b together form a circular array. The bellows 629 change their volumes in dependency upon the pressure differentials between their interior and the surrounding atmosphere. Such volumetric changes are possible due to the deformability of the material of the bellows. The bellows 629 shown in FIGS. 8, 14 and 15 are assumed to consist of thin metallic sheet material.

FIG. 16a shows an empty (deflated) bellows 629 and shows that this bellows is located at the side of the piston 616 facing away from the fluid flow regulator 622. FIG. 16b shows an at least partially inflated bellows 629. Each of FIGS. 16a, 16b shows the bypass clutch including the wall 604 and the piston 616 in disengaged condition in order to facilitate the interpretation of the manner in which various constituents of the bypass clutch and of its fluid flow regulator 622 are affixed to each other. However, it is to be borne in mind that the regulator 622 is activated and that the bellows 629 can perform their intended functions only or primarily when the bypass clutch 613 is at least partly engaged.

FIG. 16a shows that the friction lining 614 at the right-hand side of the wall 604 has a friction surface 614' provided with a recess 630 a portion of which registers with the port 629b of the piston 616. Each recess 630 has an open radially inner end and a closed radially outer end. When the piston 616 turns relative to the wall 604 and/or vice versa, each port 629b communicates with each of the recesses 630 once during each complete revolution of the parts 604, 615 relative to each other.

It is now assumed that the pressure in the plenum chamber 618 shown in FIG. 16a rises above that in the chamber 617 (reference should be had again to the description of the mode of operation of the torque converter 101 shown in FIG. 2). Therefore, the fluid in the chamber 18 deforms the bellows 629 whenever the respective ports 629b communicate with the adjacent recesses 630 so that a certain amount of fluid can flow in the recesses 630 radially inwardly and into the chamber 617. An inflated bellows 629 is shown in FIG. 16b, and a deflated bellows is shown in FIG. 16a. The flow of fluid from the bellows 629, through the ports 629b, through the recesses 630 and into the chamber 617 causes a cooling of the surfaces 614', 615' which slide relative to each other while the wall 604 and the piston 616 turn relative to each other when the bypass clutch operates with slip.

The bellows 629 are refilled, again and again, during successive stages of angular movements of the parts 604, 616 relative to each other when the ports 629b communicate with radially outwardly extending recesses 630a (see FIG. 16b) which alternate with the recesses 630 and are also provided in the friction surface 614' of the friction lining 614 on the wall 604. Each recess 630a has a closed radially inner end (disposed radially inwardly of the ports 629b) and a radially outer end communicating with the chamber 618. Each bellows 629 receives fluid from the chamber 618 when the respective port 629b communicates with one of the radially outwardly open recesses 630a.

The just described repeated and at least partial emptying and at least partial refilling of the bellows 629 takes place as long as the wall 604 and the piston 616 turn relative to each other, i.e., as long as the bypass clutch operates with slip. Such repeated refilling and emptying of the bellows 629 is interrupted whenever the bypass clutch operates without slip and whenever the bypass clutch is disengaged (i.e., when the friction surfaces 614', 615' are out of frictional engagement with each other).

It will be seen that the bellows 629 can be said to cooperate with or to form part of the fluid flow regulating arrangement 622. A feature common to the regulating arrangement 622 and to the bellows 629 is that each thereof operates in dependency upon the presence or absence and/or extent of slip of the surfaces 614', 615' relative to each other.

The number of ports 629b and the numbers of recesses 630, 630a can be readily selected in such a way that the likelihood of vibrations and/or noise generation, as a result of repeated (rhythmical) overlapping of the recesses 630, 630a with the ports 629b to bring about repeated filling and emptying of the bellows 629, is very remote or nil. This not only applies to the parts 613, 616 but also to all component parts of the improved torque converter as well as to other component parts in the power train and/or in other units of a motor vehicle.

The number of ports 629b is preferably different from that of the recesses 630, 630a, and such numbers preferably have a large common denominator.

FIGS. 17a and 17b show a modified assembly of parts in and at the fluid flow regulator of a bypass clutch 613a. The bellows 629 (only one shown) are mounted on the radially outermost portion of the piston 616, the same as the friction lining 615; this friction lining is not provided with recesses 630, 630a of the type shown in FIGS. 16a and 16b; instead, such recesses are provided in the friction surface 614's of the wall 604 and the friction lining 615 is provided with ports 629' registering with the ports 629b in the radially outermost portion of the piston 616. The grooves or recesses 630, 630a are impressed or milled or eroded into the right-hand side of the wall 604.

FIGS. 18a and 18b illustrate a portion of a bypass clutch 613c wherein the bellows 629 are borne by the outer side of the wall 604 and the piston 616 carries a friction lining 614 with recesses 630, 630a of the type shown in FIGS. 16a and 16b. The recesses 630a, 630b are provided in the surface 614' of the friction lining 614, and the ports 629b are provided in the wall 604.

Figure 19A:
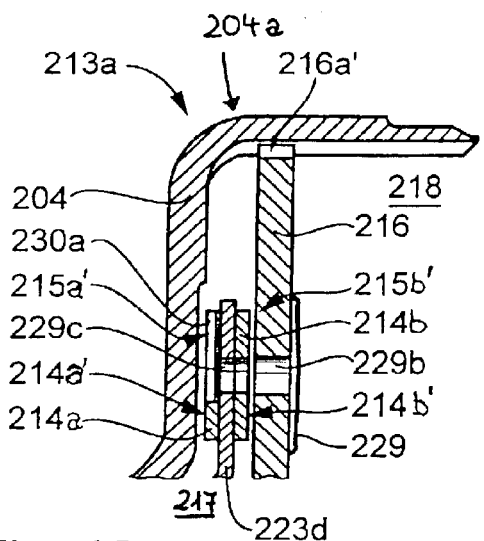
FIG. 19a is a fragmentary axial sectional view of a bypass clutch similar to that shown in FIG. 3 but employing bellows one of which is shown in deflated condition.
Figure 19B:
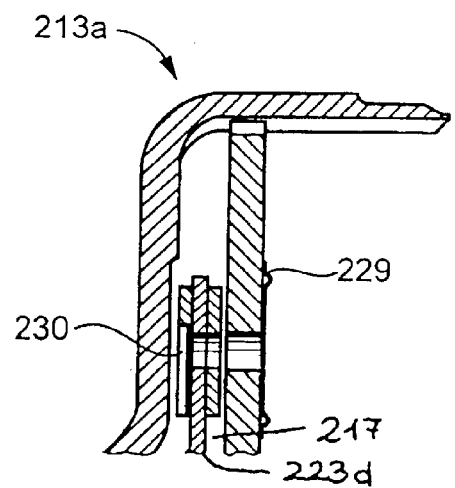
FIG. 19b shows the structure of FIG. 19a but with the bellows deflated.

FIGS. 19a and 19b illustrate, drawn to a larger scale, certain details of a bypass clutch 213a constituting a modification of the bypass clutch 213 shown in FIG. 3. The leaf springs 216a of the torque converter 213 are omitted, and the piston 216 of the bypass clutch 213a is non-rotatably but axially movably affixed to the inner side of the tubular radially outermost portion of the torque converter housing 204a by two sets of mating gear teeth 216a'.

FIGS. 19a and 19b show the bypass clutch 213a in disengaged condition in order to facilitate the understanding of the relationships between various interconnected and relatively movable parts; however it will be appreciated that the illustrated parts cooperate only when the clutch 213a is at least partly engaged. The same applies for the friction clutch 213b which is shown in FIGS. 20a and 20b.

Figure 20A:
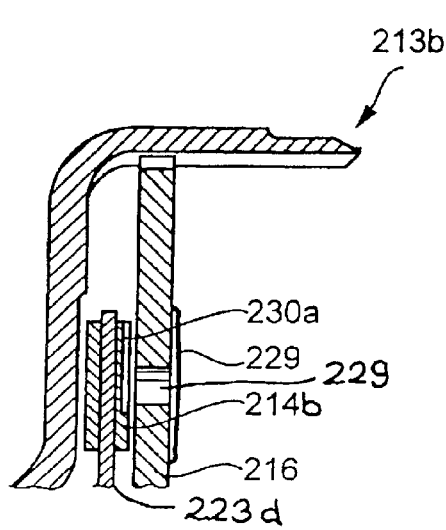
FIG. 20a is a fragmentary axial sectional view of a bypass clutch constituting a modification of the clutch shown in FIGS. 19a and 19b, with the bellows inflated.
Figure 20B:
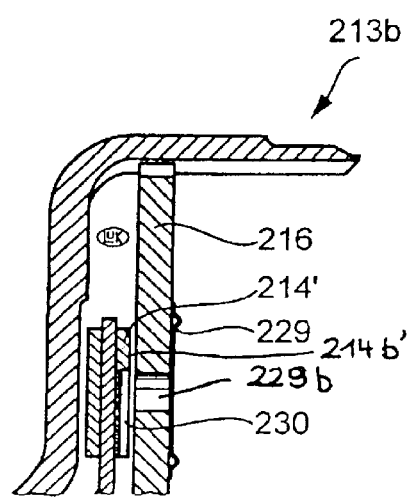
FIG. 20b shows the bypass clutch of FIG. 20a but with the bellows deflated.

The friction lamella 223d which is shown in FIGS. 19a and 20a carries a first friction lining 214a having a friction surface 214a' confronting a friction surface 215b' at the inner side of the wall 204, and a second friction lining 214b having an exposed friction surface 214b' confronting a friction surface 215a' of the piston 216. A set of inflatable receptacles (called bellows) 229 is provided at the right-hand side of the piston 216, and the latter has openings 229b (hereinafter called ports) communicating with successive opening or ports 229c in the lamella 223d.

The lamella 223d further carries a second friction lining 214b having an exposed friction surface 214b' confronting a friction surface 215b' on the piston 216. In FIG. 19a, the illustrated bellows 229 can receive fluid from the chamber 217 via recesses 230a provided in the friction surface 214a' of the friction lining 214a, ports 229c of the lamella 223d and ports 229b in the piston 216.

In FIG. 19b, the reference character 230 denotes one of those recesses which alternate with the recesses 230a (one shown in FIG. 19b) but are open toward the chamber 217. Fluid can enter the bellows 229 via recesses 230a, ports 229c and ports 229b. In FIG. 19a, fluid can enter the bellows 229 from the chamber 218 via form-locking connection 216a' and/or through one or more openings (not shown in FIG. 19a) in the pisron 216 between the connection 216a' and the friction surface 215b' and thereupon through the ports 229b.

The grooves 230 are provided in the surface 214' of the friction lining 214a which engages the friction surface 215a' of the wall 204 in the engaged condition of the friction clutch 213a. In order to establish communication between the ports 229b, the friction linings 214a, 214b and the lamella 223d are provided with the ports 229c.

The emptying of the bellows 229 is shown in FIG. 19b. The recesses 230a (FIG. 19a) alternate with the recesses 230 (FIG. 19b). The exact manner in which the fluid is caused or permitted to leave the bellows 229 is the same as or analogous to that already described with reference to FIG. 16a.

FIGS. 20a and 20b respectively illustrate the emptying and refilling of bellows 229 in a manner analogous to that already described with reference to FIGS. 19a and 19b., The difference between the bypass clutches 213a and 213b of FIGS. 19a–19b and 20a–20b is that, in the clutch 213a, recesses are provided in the friction surface 215b' of the friction lining 215. Consequently, the ports 229c of FIGS. 19a–19b are not necessary in the friction clutch 213b of FIGS. 20a–20b because the fluid flowing between the ports 229b and the recesses 230 or 230a shown in FIGS. 20a–20b need not flow through part 223d.

The features of the friction clutches 213a, 213b respectively shown in FIGS. 19a–19b and 20a–20b can be combined in a single torque converter, i.e., each of the friction linings 614a, 614b can be provided with recesses 230, 230a. In such embodiment of the present invention, alternating bellows 229 are or can be arranged to respectively receive and/or discharge fluid by way of channels 230, 230a provided in the friction linings 214a and 214b.

Figure 21:
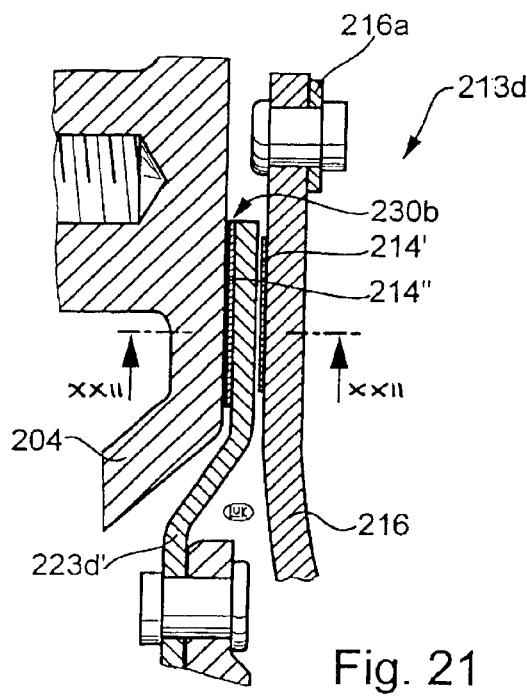
FIG. 21 is a fragmentary axial sectional view of a bypass clutch constituting a further modification of the bypass clutch in the torque converter of FIG. 3.

FIG. 21 illustrates a portion of a torque converter having a bypass clutch 213d which constitutes a further modification of the clutch 213 shown in FIG. 3. The friction lamella 223d' is flanked by two friction linings 214', 214" which are affixed to the wall 204 and to the piston 216, respectively. The piston 216 is axially movably but non-rotatably affixed to the housing including the wall 204 by leaf springs 216a. The friction linings 214', 214" frictionally engage the respective sides of the lamella 223d' when the bypass clutch 213d is at least partially engaged.

Figure 22:
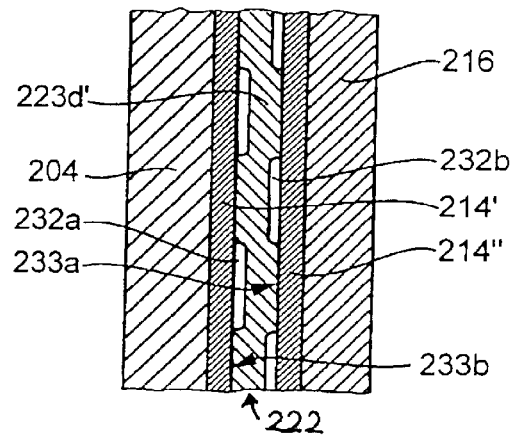
FIG. 22 is an enlarged fragmentary sectional view as seen in the direction of arrows from line XXII—XXII shown in FIG. 21.

The left-hand side of the lamella 223d' is provided with a profile 230b which varies in the circumferential direction and the details of which are shown in FIG. 22. The left-hand (233b) and right-hand (233a) sides of the lamella 223d' (as seen in FIG. 22) constitute friction surfaces which respectively engage the adjacent friction linings 214' and 214". The surfaces 233b and 233a are respectively provided with recesses 232a, 232b; these recesses form part of the fluid flow regulating arrangement 222, i.e., of the arrangement which regulates the flow of fluid between the plenum chambers 217, 218 (see FIG. 3) when the structure shown in FIGS. 21 and 22 is incorporated into the torque converter 201 of FIG. 3. The arrangement 222 then serves to determine the rate of fluid flow between the chambers 217, 218 in dependency upon the temperature (and hence the viscosity) of the fluid. As concerns the parameters (such as the depth, the width, the length, the number and the orientation) of the grooves 232a, 232b, reference should be had to the descriptions of the bypass clutches shown in FIGS. 16a–16b, 17a–17b and 18a–18b, especially in FIGS. 17a–17b and by bearing in mind that the structure actually shown in FIGS. 21 and 22 does not employ bellows (such as those shown at 629 in FIGS.16a–18b).

Figure 23:
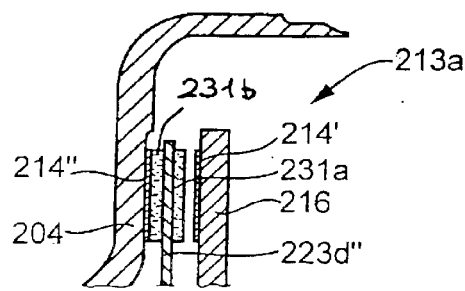
FIG. 23 is a fragmentary axial sectional view of a bypass clutch constituting a modification of that shown in FIG. 12.
Figure 24:
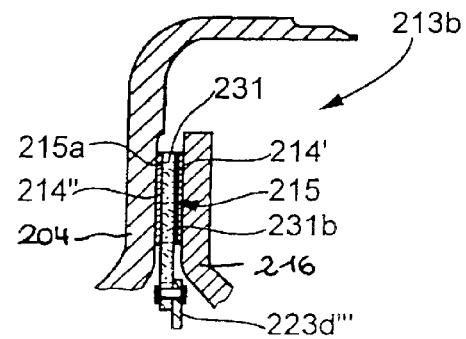
FIG. 24 is a similar fragmentary axial sectional view of a bypass clutch constituting a modification of those shown in FIGS. 12 and 23.

FIGS. 23 and 24 illustrate a structure which constitutes a modification of that shown in FIG. 12. In the bypass clutch 213a of FIG. 23, a friction lamella 223d" carries two porous layers 231a, 231b which are respectively adjacent a friction lining 214" on the wall 204 and a friction lining 214' on the piston 216. The friction lining 214' can be affixed to the porous layer 231a instead of to the piston 216, and the friction lining 214" can be affixed to the porous layer 213b (instead of to the wall 204). Furthermore, the bypass clutch 213a can utilize all of the parts shown in FIG. 23 plus at least one additional friction lining (affixed to the porous layer 231a or 231b).

In FIG. 24, the bypass clutch 213b comprises a single porous layer 231 (e.g., a layer made of sintered metal) which is riveted to the friction lamella 223d". The layer 231 has friction surfaces 215, 215a which (when the clutch 213b is at least partly engaged) respectively bear upon friction linings 214' (provided on the piston 216) and 214" (provided on the wall 204). The radially outermost portion of the friction lamella 223d" is located radially inwardly of the friction linings 214', 214".

FIG. 25 shows certain details of a bypass clutch 613d having a friction generating device 621 composed of parts 614, 615. A piston 616d replaces the piston 116 or 616 of FIG. 2 or FIG. 8 to allow for an advantageous further modification of the fluid flow regulating arrangement 122 of FIG. 2 or 622 of FIG. 8. The fluid flow regulator embodying certain parts of the structure shown in FIG. 25 serves to regulate the flow of hydraulic fluid between the plenum chambers 617 and 618.

The wall 604 of FIG. 25 carries a friction lining 614' which is provided with circumferentially distributed recesses or grooves 630d extending radially outwardly to register with ports 629b in the radially outer portion of the piston 616d. The radially outer ends of the recesses 630d are closed from the chamber 618 (when the bypass clutch 613d of FIG. 25 is at least partly engaged) but the radially inner ends of such recesses are open toward the chamber 617.

The bellows 629 are not used in the bypass clutch 613d; instead, the ports 629b of the piston 616d communicate directly with the chamber 618. When the piston 616d and the housing (including the wall 604) are caused to turn relative to each other, the ports 629b move into and beyond positions of register with the recesses 630d of the friction lining 614' on the wall 604 to thus respectively establish paths for the flow of fluid between the chambers 617 and 618. Such repeated flow of fluid between the chambers 617, 618 ensures that at least the friction lining 614' is adequately cooled as soon and as long as the bypass clutch 613d operates with slip.

If the pressure of fluid in the chamber 618 rises above that in the chamber 617, i.e., if the piston 616d is moved axially toward the wall 604, the extent of relative angular movement of the piston 616d and the housing (including the wall 604) of the torque converter decreases and comes to a halt when the clutch 616d is fully engaged. The number of ports 629b and/or the number of recesses 630d can be selected in such a way that the likelihood of unsatisfactory or unacceptable overlap is remote or nil; this can be readily accomplished by proper selection of the numbers and/or proper distribution of the ports 629b and recesses 630d.

Furthermore, and as actually shown in FIG. 25, one can provide a closing device or lid 635 which, when the bypass clutch 613d is engaged, seals the ports 629b from the plenum chamber 618 so that there can be no flow of fluid from the chamber 618, via ports 629b and recesses 630d, and into the chamber 617 (wherein the fluid pressure is assumed to be lower than in the chamber 618 when the bypass clutch 613d is fully engaged, i.e., when such bypass clutch operates without slip). The reason for the provision of the closing device 635 is that there is no need to cool the friction lining 614' when the bypass clutch 613d is fully engaged so that the wall 604 and the piston 616d cannot slip relative to each other.

It is clear that the closing device 635 can be designed to close and actually seal only some of the ports 629b from the plenum chamber 618.

FIG. 26 shows, drawn to a larger scale, the structure within the phantom-line circle Y in FIG. 25. FIG. 27 is a view as seen in the direction of arrow X in FIG. 26, and FIG. 28 is a view as seen in the direction of arrow W in FIG. 25. The closing device 635 comprises a series of tongues or flaps 635a which are pivotable to move substantially axially of the bypass clutch 613d. The tongues 635a form integral parts of or are pivotably mounted on a ring-shaped carrier 635 which is welded, riveted or adhesively or otherwise affixed to the piston 616d. It is preferred to make the carrier 635b of a resilient material and to ensure that the tongues 635a tend to assume their inoperative or idle positions (shown in FIGS. 25 to 27) in which they permit fluid to flow from the chamber 618 into the ports 629b. For example, the carrier 635b and its tongues 635a can be made of thin layers of spring steel. The thickness and/or the resiliency of the material of the carrier 635b are selected in such a way that the tongues 635a are compelled to yield and to pivot to their operative or closed positions (to seal the respective ports 629b from the chamber 618) as soon as the pressure of fluid in the chamber 618 ries to a value indicating that the clutch 613d of FIGS. 25-28 is engaged, i.e., that the wall 604 and the piston 616d do not turn relative to each other. When the pressure differential between the bodies of fluid in the chambers 617, 618 decreases, the innate resiliency of the tongues 635a suffices to initiate a movement of the tongues to the open positions shown in FIGS. 25 to 27.

In order to even more reliably ensure pivotal movements of the tongues 635a to their open or inoperative positions as soon as the piston 616d and the wall 604 are free to turn relative to each other, the friction lining 614' of FIG. 25 is provided with at least one groove which is open radially outwardly; such groove or grooves permits or permit entry of fluid which exerts pressure upon the tongues 635a and ensures or ensure that the tongues reassume the open positions of FIGS. 25-27 as soon as the wall 604 and the piston 616 begin to turn relative to each other. Otherwise stated, the just mentioned groove or grooves in the friction lining 614' ensures or ensure that the pressure of fluid at the inner sides of the tongues 635a is the same as at their outer sides (i.e., in the plenum chamber 618) as soon as the wall 604 and the piston 616d begin to turn relative to each other so that the innate tendency of the tongues 635a suffices to maintain them in open positions when the clutch 613d is partially engaged so that it operates with slip.

By embodying the structure of FIGS. 25-28 in the bypass clutch of FIG. 2 and/or 8, one ensures that the respective fluid flow regulating assembly (122 or 622) even more reliably ensures adequate cooling of the hydraulic fluid by exchange of heat as long as the respective bypass clutch operates with slip, and that the extent of cooling is commensurate with (a) the speed of relative angular movement between the torque converter housing (wall 104 or 604) and the piston (116 or 616), and (b) the extent of pressure differential between the bodies of fluid in the plenum chambers (117 and 118 or 617 and 618). On the other hand, the tongues 635a in the structure of FIGS. 25-28 also ensure that the circulation of fluid through the fluid flow regulating arrangement 122 or 622 is interrupted when a cooling of fluid is not necessary, i.e., when the bypass clutch embodying the structure of FIGS. 25-28 is disengaged or fully engaged.

The structure which is shown in FIGS. 25-28 (or one or more structural and functional equivalents thereof) can be utilized with equal or similar advantage in torque converters which are different from those shown in FIGS. 2 and 8, i.e., with differently configurated, mounted and assembled friction linings, friction lamellae and/or other constituents of the fluid flow regulating arrangements. By way of example only, the structure shown in FIGS. 25-28 can be incorporated into torque converters embodying the features of the structures shown in FIGS. 16a to 20b.

FIGS. 29a to 29k respectively illustrate portions of friction linings 636a to 636k which can be utilized in lieu of previously described friction linings (such as those shown in FIGS. 16a to 20b) to ensure even more predictable flow of fluid between the two plenum chambers (not shown in FIGS. 29a to 29k).

For example, if one utilizes a fluid flow regulating arrangement 622 (FIG. 8) or 622a (FIG. 25), it is advisable to employ radially inwardly opening grooves or recesses 636a"–636k" (see FIGS. 29a-29k) as well as radially outwardly open recesses 636a'–636k' in such numbers that the overall number of radially outwardly opening recesses (e.g., 636a') matches or approximates the overall number of radially inwardly opening recesses (e.g., 636a"). Moreover, individual radially inwardly opening recesses (such as 636a") or groups of such recesses can alternate with individual radially outwardly opening recesses (such as 636a') or groups of such recesses, as seen in the circumferential direction of the respective friction ring (such as 636a). The recesses or grooves of each set can be equidistant from each other and can be straight, arcuate, undulate, zigzag shaped, comb-shaped, T-shaped, V-shaped and/or otherwise configurated.

It is also possible to alternate groups of two or more inwardly opening recesses (such as 636a") with individual outwardly opening recesses (such as 636a'); such arrangement can be resorted to in the embodiment of FIG. 25).

Figure 29A:
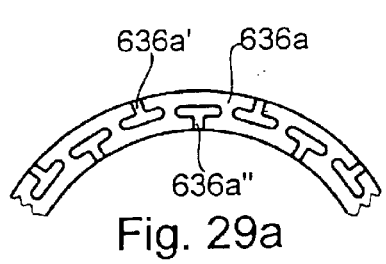
FIGS. 29a to 29k are fragmentary elevational views of eleven differently grooved or recessed friction linings which can be utilized in several versions of bypass clutches embodying the present invention.

FIG. 29a shows that the radially inner ends of the recesses 636a', 636a" extend circumferentially of the friction lining 636a. If such arrangement is used in the embodiment of FIGS. 16-16b, it ensures longer-lasting communication of successive alternating recesses 636a' and 636a" with successive ports 629b shown in FIGS. 16a and 16b.

Figure 29B:
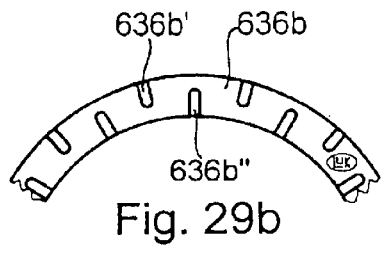
Figure 29C:
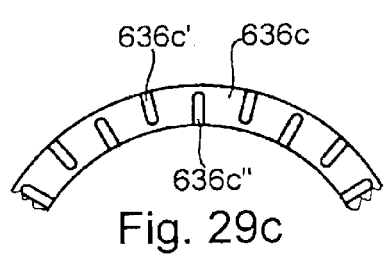

The recesses or grooves 636b and 636c of FIGS. 29b and 29c extend radially of the respective friction linings 636b, 636c; therefore, the intervals of communication with the ports 629b of FIGS. 16a-16b (if the friction lining shown in FIGS. 16a and 16b is replaced with the friction lining 636b or 636c) are relatively short if and when the wall 604 and the piston 616 of FIGS. 16a and 16b are caused to turn relative to each other. The depths of the recesses 636b', 636b" are such that their closed inner ends communicate with successive ports 629b if the friction lining 636b replaces the friction lining shown in FIGS. 16a and 16b.

The recesses 636c', 636c41 of the friction lining 636c shown in FIG. 29c are much longer than those shown in FIG. 29b.

Figure 29D:
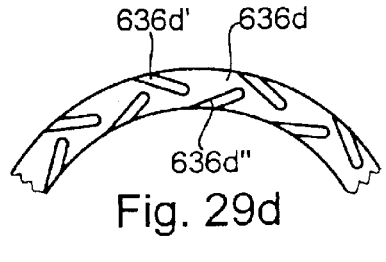
Figure 29E:
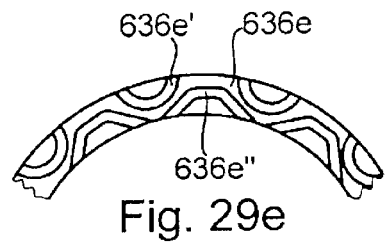
Figure 29F:
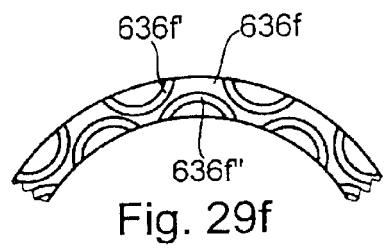
Figure 29G:
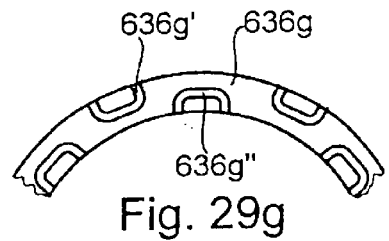

The inclination of the straight recesses 636d', 636d" in the friction lining 636 of FIG. 29d is dependent upon the desired duration of communication with successive ports 629b if the friction lining 636d replaces the one shown in FIGS. 16a and 16b. The illustrated recesses 636d', 636d" are inclined in the same direction, i.e., clockwise, as seen in FIG. 29d; however, they can be inclined in opposite directions if so required or desirable or advantageous for a specific mode of fluid flow regulation.

Each of the recesses 636e', 636e" (in the friction lining 636e of FIG. 29e), 636f', 636f" (in the friction lining 636f of FIG. 29f) and 636g', 636g" (in the friction lining 636g of FIG. 29g) has two open ends which extend inwardly from the outer and inner edge faces of the respective friction lining. The recesses of the friction linings shown in FIGS. 29e to 29g can have identical (FIGS. 29e, 29g) or different (FIG. 29f) shapes and/or sizes, such as part circular, U-shaped, trapeziform or U-shaped outlines.

Figure 29H:
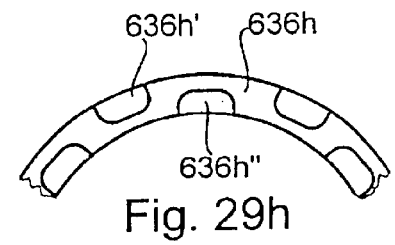
Figure 29I:
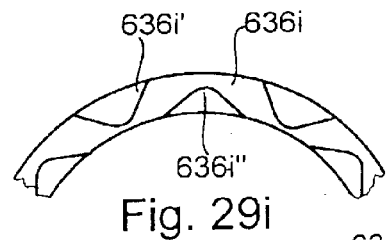

FIGS. 29h and 29i respectively show recesses 636h', 636h" and 636i', 636i" having widths (as seen circumferentially of the respective friction rings 636h, 636i) greatly exceeding their depths. Furthermore, the depths of the recesses 636i', 636i" vary continuously, as seen in the circumferential direction of the friction ring 636i.

It is to be noted that the FIGS. 29a-29k illustrate merely a relatively small number of different recesses 636a'–636k' and 636a"–636k". Thus, it is possible to combine the shapes actually shown in these Figures to arrive at a host of additional configurations having constant or varying depths and/or widths and/or lengths, depending upon the desired nature, duration and other characteristics of fluid flow between the two plenum chambers.

Figure 29J:
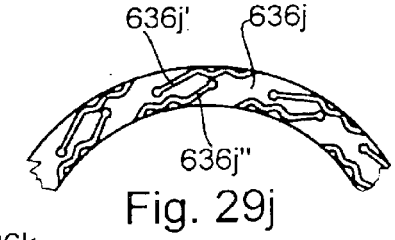

FIG. 29j shows a friction lining 636j wherein the zig-zag shaped recesses 636j', 636j" are dimensioned, configurated and oriented to ensure extensive (pronounced) cooling of the friction lining because such recesses can come into frequent and long-lasting contact with successive ports 629b (if the friction lining 636j is utilized in the structure shown in FIGS. 16a and 16b).

Figure 29K:
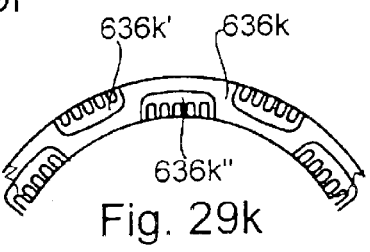

The comb-shaped grooves 636k', 636k" in the friction lining 636k of FIG. 29k also ensure long-lasting communication of their ridges with successive ports 629b if the friction lining 636k is utilized in lieu of the friction lining shown in FIGS. 16a and 16b.

At least some of the grooves or recesses shown in FIGS. 29a-29k can be utilized in parts other than friction linings, e.g., in lieu of the recesses 630a, 630 respectively shown in FIGS. 17a and 17b; the recesses 630a, 630 are provided in the inner side of the wall 604, i.e., in a portion of the housing of the torque converter including the structure shown in FIGS. 17a and 17b.

Still further, it is possible to provide recesses or grooves of the type shown in FIGS. 29a to 29k in the piston of the bypass clutch or in a friction lamells (see the part 223d' shown in FIGS. 21 and 22).

Figure 30:
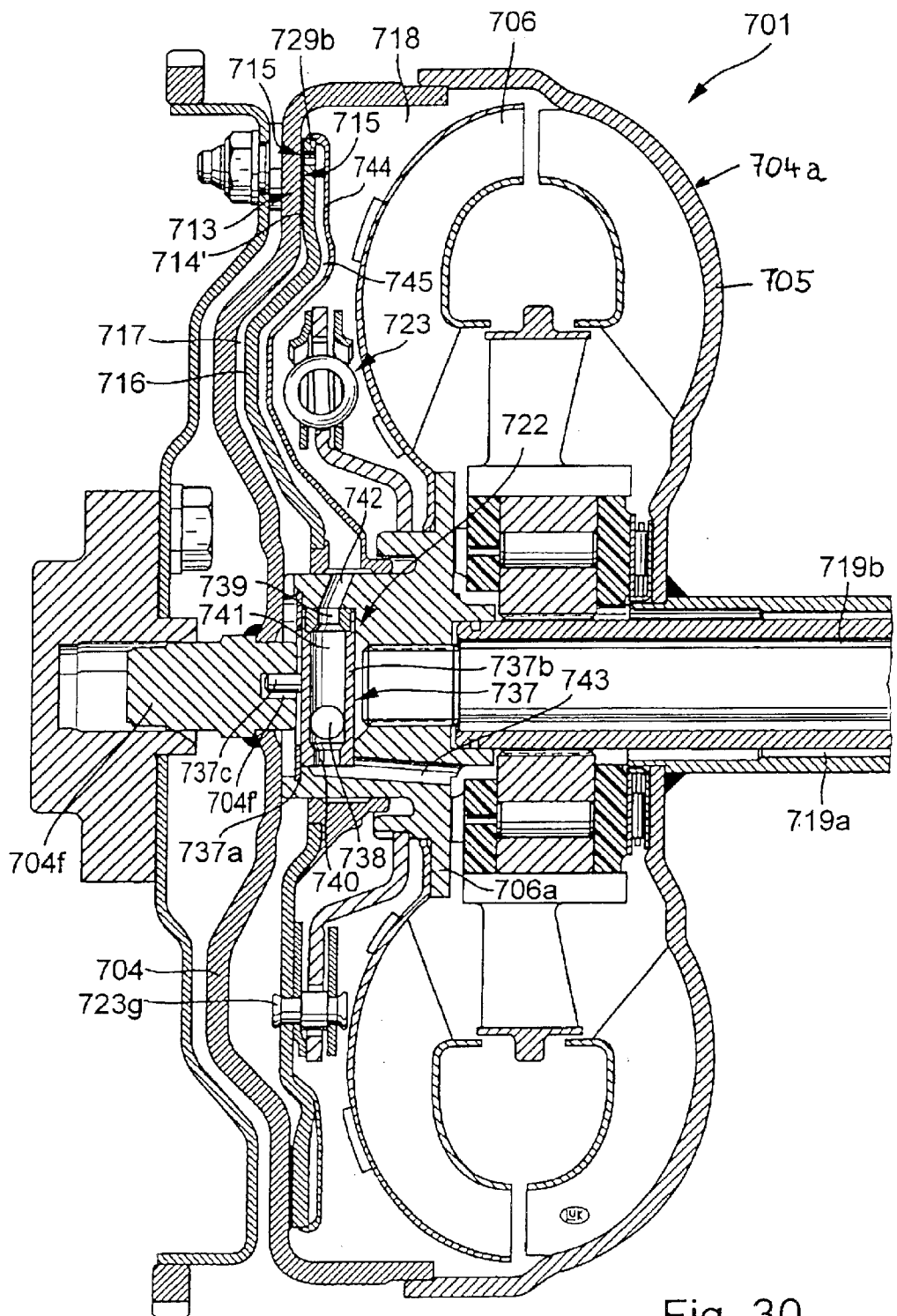
FIG. 30 is an axial sectional view of a torque converter embodying a bypass clutch which is arranged to be cooled by a pump installed in the hub of the turbine of the torque converter.

FIG. 30 shows a hydrokinetic torque converter 701 having a fluid flow regulating arrangement 722 which is effective to influence the operation of the bypass clutch 713, namely to regulate the rate of fluid flow between the wall 704 of the housing 704a of the torque converter and the axially movable piston 716. The controlling factor is the difference between the RPM of the wall 704 and that of the piston 716.

The reference character 737 denotes a metering pump which is installed in the hub 706a of the turbine 706 in the housing 704a. The piston 716 and the turbine constitute the output members of the bypass clutch 713. A torsional vibration damper 723 is employed to prevent the transmission of vibrations from the piston 716 and/or from the turbine 706 to the hub 706a and hence to the transmission when the bypass clutch 713 is engaged to operate with or without slip.

The pump 737 is rotatable relative to and is confined in the hub 706a. A safety ring 737a is provided to prevent axial movements of the pump 737 relative to the hub 706a. The housing 737b of the pump 737 is non-rotatably connected with the wall 704 but is rotatable relative to the hub 706a. The non-rotatable connection between the pump housing 737b and the wall 704 comprises at least one projection or stud 737c provided on the pump housing and extending into a socket 704f' of a plug or stud 704f which is welded to the wall 704. The pump housing 737b confines a pumping element 738 here shown as a sphere which is movable back and forth in a preferably cylindrical internal chamber or space 741 to seal the opening or outlet 739 or 740 of the pump 737. The openings 739, 740 are or can be surrounded by suitable sealing elements (such as elastic washers, O-rings or the like). The openings 739, 740 respectively confront conduits 742, 743 which are provided in the hub 706a and respectively communicate with an inlet 719a and an outlet 719b for hydraulic fluid.

When the housing 704a and the plug 704f turn relative to the hub 706a and/or vice versa, the openings 739, 740 alternately but simultaneously communicate with the conduits 742, 743 in response to successive 180° turns of the pump housing 737b. Thus, when the wall 704 turns relative to the hub 706a and the pressure of fluid in the conduit 743 exceeds that in the conduit 742, successive quantities of fluid entering chamber 741 are transferred from the conduit 743 into the conduit 742. The spherical pumping element 738 is caused to move in the chamber 741 back and forth first into sealing position relative to the opening 739, thereupon (as a result of rotation of the pump housing 737b through 180° with the wall 704 relative to the hub 706a) to the position in which it seals the opening 740, again into a position in which it seals the opening 739, and so forth. This causes the transfer of metered quantities of fluid from the conduit 743 into the conduit 742. Such pumping of successive metered quantities of fluid continues as long as the wall 704 and the hub 706a turn relative to each other (this also involves rotation of one of these parts relative to the other part).

When the clutch 713 is disengaged, the pressure in the conduit 742 matches that in the conduit 743 so that the rate of fluid flow between these conduits is practically nil even if the wall 704 turns relative to the hub 706a and/or vice versa (due to slip of the turbine 706 and the pump 705 relative to each other).

The means for conveying metered quantities of fluid from the conduit 742 into the region of the bypass clutch 713, namely to the locus of direct or indirect frictional engagement of the piston 716 with the wall 704, i.e., for removing heat from the friction surfaces 714', 715', includes a disc-shaped member 744 which cooperates with the piston 716 to define a chamber 745 which communicates with the conduit 742 and is sealed from the plenum chamber 718. The member 744 can constitute an injection molded plastic part or an embossed sheet metal part; this member is sealed outwardly against the piston 716 and inwardly against the hub 706a.

The reference character 723g denotes a rivet constituting one of the fasteners which secure the the torsional vibration damper 723 to the piston 716; the member 744 can have a cutout for each of the fasteners 723g, and each such cutout is surrounded by a seal (not shown) which ensures that fluid entering the chamber 745 is compelled to flow from the openings 739, 740 to the bypass clutch 713.

The radially outermost portion of the piston 716 has an annulus of ports 729b which direct pressurized fluid from the chamber 745 against the friction lining 714', and such fluid ultimately enters the plenum chamber 717 or 718 to exchange heat with the friction lining 714' and to transfer such heat to the body of fluid in the chamber 717 or 718. The reference character 715 denotes a friction surface provided on the friction lining 714' and having grooves of the type shown, for example, in FIG. 19b to direct the fluid into the plenum chamber 717. The chamber 717 communicates with the outlet 719b.

The aforementioned grooves (e.g., in the surface 715) can be of the type shown in FIGS. 29a to 29k, except that all such grooves are laid out to convey hydraulic fluid from the ports 729b (i.e., from the chamber 745) into the chamber 717 (reference should be had to the grooves 636a" to 636k" shown in FIGS. 29a to 29k.

The plenum chamber 718 of the torque converter 701 receives fluid from the inlet 719a for pressurized fluid in a manner not specifically shown in FIG. 30; the path for the flow of fluid from the inlet 719a of the torque converer 701 to the chamber 718 is defined by parts not visible in the sectional view of FIG. 30.

Figure 31:
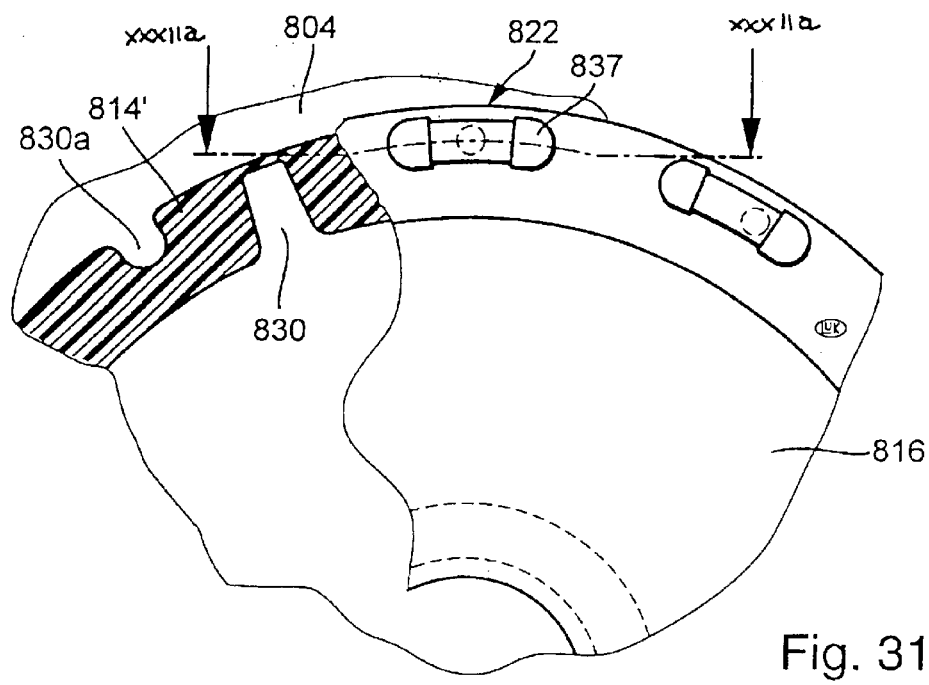
FIG. 31 is a fragmentary elevational view of a bypass clutch wherein the cooling system employs an array of pumps mounted on the radially outermost portion of the piston of the bypass clutch.
Figure 32A:
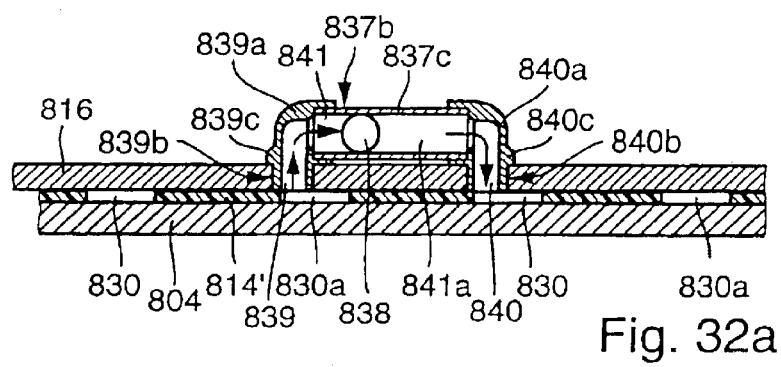
FIG. 32a is an enlarged sectional view substantially as seen in the direction of arrows from the line XXXIIa—XXXIIa shown in FIG. 31.
Figure 32B:
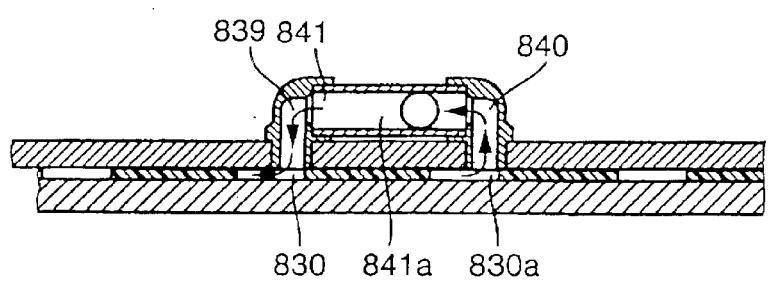
FIG. 32b is a sectional view similar to that of FIG. 32a but showing the pumping element of the illustrated pump of the cooling system in a different position relative to the pump housing.

FIGS. 31, 32a and 32b illustrate the details of a further fluid flow regulating arrangement 822 which constitutes a modification of the arrangement shown in FIG. 30. The piston 816 of the bypass clutch in the torque converter which embodies the structure of FIGS. 31, 32a and 32b is provided with an annular array of circumferentially spaced-apart metering pumps 837 (two shown in FIG. 31) which, in contrast to the centrally mounted pump 737 of the torque converter 701 shown in FIG. 30, are mounted in the region of frictional engagement between the parts of the fluid flow regulating arrangement 822 when the clutch including the piston 816 is at least partly engaged, i.e., when the wall 804 of the housing of the torque converter and the piston 816 turn relative to each other.

The character 814' denotes a friction lining which can be affixed (e.g., bonded) to the piston 816 or to the wall 804 (preferably to the wall). The pumps 837 are adjacent the radially outermost portion of the piston 816; an advantage of such mounting of the pumps is that the delivery of fluid to their inlets or intakes and the flow of fluid from their outlets are simpler and hence the entire torque converter is less expensive than that embodying the structure shown in FIG. 30.

The ends of the elongated pumps 837 are provided with outlets 839, 840 constituted by pipes 839a, 840a (see FIG. 32a) which are recessed in the piston 816 to the extent determined by the stops 839c, 840c, respectively. The pipes 839a, 840a and a length of a pipe 837c between them together constitute the housing 837b of the respective pump 837. The pumping element 838 is a sphere which is movable back and forth in the pipe 837a all the way between the pipes 839a, 840a.

The pipes 839a, 840a can constitute composite (such as two-part) components made, e.g., in an injection molding machine, of a suitable plastic material. The same applies for several or all other parts of each pump 837.

The friction lining 814' of the torque converter shown in part in FIGS. 32a and 32b is assumed to be affixed to the wall 804 of the housing of the torque converter. This friction lining has radially outwardly extending recesses or cutouts 830 which alternate with radially inwardly extending recesses or cutouts 830a. These recesses extend inwardly to an extent such that they communicate with the openings 839, 840 (these are used as inlets or outlets) of successive pumps 837 when the wall 804 and the piston 816 turn relative to each other. The spacing of the recesses 830, 830a in the circumferential direction of the friction lining 814' is such that one thereof registers with the opening 839 of a pump 817 while the other thereof registers with the opening 840. The illustrated recesses 830, 830a constitute but one of numerous embodiments which can be provided in the friction lining 814'; reference may be had, for example, to FIGS. 29a to 29k.

If a friction lining (replacing the friction lining 814'on the wall 804) is replaced with a friction lining on the piston 816, the recesses 830, 830a or their equivalents are machined into or otherwise provided in that surface of the wall 804 which confronts the piston 816.

The mode of operation of the bypass clutch embodying the structure shown in FIGS. 31, 32a and 32b is such that, when the fluid flows from one of the two plenum chambers (e.g., from the plenum chamber 118 shown in FIG. 2), such fluid is caused to enter the recesses 830a in the direction of arrows shown in FIG. 32a to cause the spherical pumping element 838 to roll or to otherwise move in the pump chamber toward the opening 840 and to expel a metered quantity of fluid into the chamber 817. Such movement of the pumping element 838 results in entry of a stream of hydraulic fluid from the chamber 818 into the portion 841 of the pump chamber via opening 839 and in simultaneous expulsion (by the pumping element 838) of a stream of fluid from the portion 841a of the pump chamber, via opening 840 and into the plenum chamber 117. The rate of fluid flow from the chamber 118 into the the chamber 117 is dependent upon the extent of angular movement of the piston 816 and the wall 804 relative to each other. When the pumping element 838 reaches the right-hand end of the pump chamber (841+841a), it seals the opening 840 from the pump chamber and the latter is filled with fluid via opening 839.

As the angular displacement of the parts 804, 816 relative to each other continues, the openings 839, 840 respectively communicate with the recesses 830, 830a (see FIG. 32b). The recess 830a admits pressurized fluid which causes the pumping element 838 to expel the contents of the pump housing 837b via opening 839 and recess 830 into the chamber 817. At the same time, the chamber 841+841a is filled with fluid entering via opening 840. This stage of operation of the pump 837 shown in FIGS. 32a and 32b is completed when the pumping element 838 seals the opening 839. The above described alternating stages of operation are repeated, again and again, as long as the bypass clutch including the piston 816 and the wall 804 operates with slip. When the bypass clutch is fully engaged, a cooling of the friction lining 814' and/or of the neighboring parts of the torque converter is no longer necessary; at such time, the pumping element 838 of each pump 837 at least substantially seals one of the openings 839, 840 in the respective pump to thus interrupt the flow of fluid between the plenum chambers 117 and 118.

FIG. 33 illustrates a portion of a torque converter 901 having a bypass clutch 913 and constituting a further modification of the torque converter 101 shown in FIG. 2. The parts 914', 915' correspond to the parts 114', 115' of the torque converter 101. The bypass clutch 913 comprises a piston 916 the radially outermost portion of which carries a ring-shaped resilient sealing element 950 having a lip 951 arranged to sealingly engage the inner side of the wall 904. The characteristics (such as the Shore hardness and/or the modulus of elasticity) of the material of the sealing element 950 in the region of the lip 951 can be influenced by one or more reinforcing inserts (such as a wire ring or the like) in such a way that the lip 951 sealingly engages the wall 904 only when the pressure of fluid in the plenum chamber 918 exceeds the pressure of fluid in the plenum chamber 917 to a predetermined extent.

The axial profile (at 952) of the right-hand side of the wall 904 is impressed (such as by embossing or by extruding) or otherwise formed to impart to such side an undulate outline which varies as seen in the circumferential direction of the bypass clutch. This profile 952 is engaged by the lip 951 when the pressure of fluid in the chamber 918 rises to a predetermined level.

FIG. 34b illustrates the lip of the sealing element 950 in full sealing engagement with the profiled inner side of the wall 904. The arrows indicate the directions of rotary movement of the parts 904 and 916 (the sealing element 950 rotates with the piston 916). If the piston 916 and the wall 904 begin to turn relative to each other, the stiffness of the reinforced lip 951 and/or the undulate shape of the profiled side 952 of the wall 904 and/or the drop of pressure in the chamber 918 (as compared with that of the chamber 917) causes the lip 951 to move away from the profile 952 and to establish pathways 953 for the flow of fluid between the chambers 917 and 918, e.g., from the chamber 918 into the chamber 917. This is shown in FIG. 34a. The friction lining 914' can be provided with recesses, channels, cutouts or like configurations which extend radially of such friction lining and permit the flow of fluid between the chambers 917, 918 at a desired optimum rate when the parts 904, 916 are caused or permitted to turn relative to each other. The structure shown in FIGS. 33, 34a and 34b also permits for an accurate regulation of fluid flow between the chambers 917, 918 to ensure adequate cooling of surfaces which are heated while the parts 904, 916 are caused or permitted to turn relative to each other.

Figure 35:
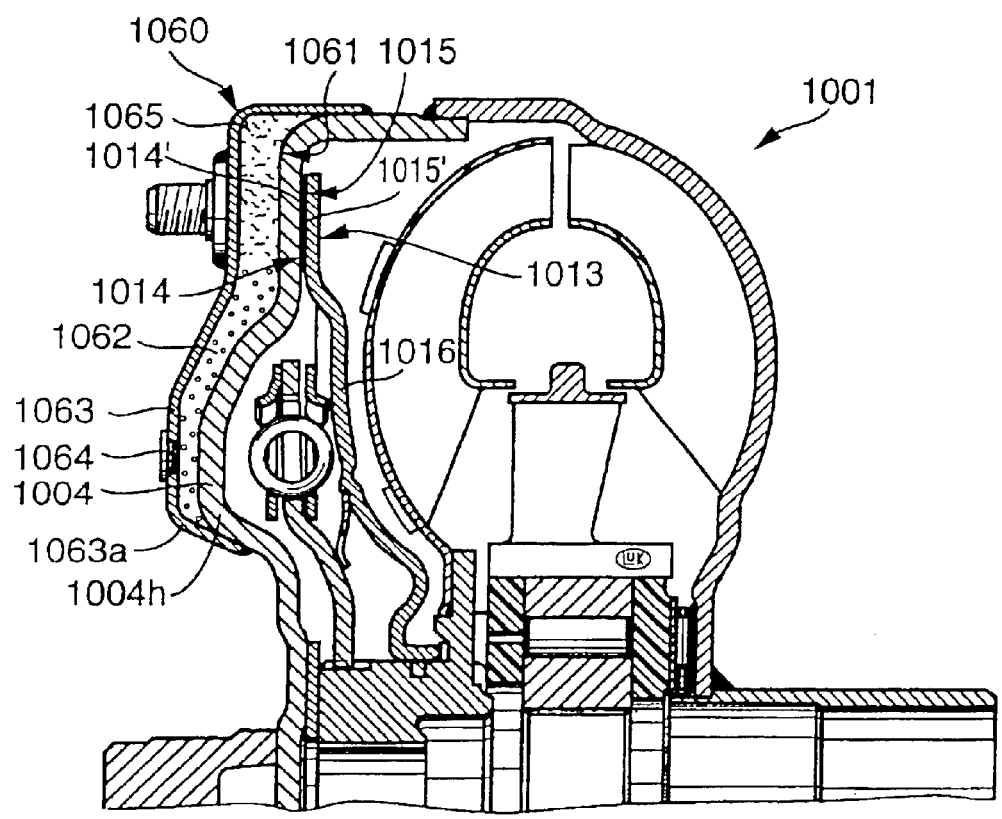
FIG. 35 is a fragmentary axial sectional view of a torque converter with a bypass clutch which is cooled by a fluid that changes its aggregate state in response to heating or cooling.

FIG. 35 shows a portion of a torque converter 1001 which embodies or can embody a fluid flow regulating arrangement corresponding to that shown at 22 in the torque converter 101 of FIG. 2, and which further comprises a cooling unit or cooling assembly 1060 serving to cool the surfaces 1015, 1014 of the friction linings 1014', 1015' in the bypass clutch 1013. The cooling unit 1060 is installed at that side (1061) of the wall 1004 which faces away from the piston 1016. It is also possible to install the cooling unit 1060 or a second cooling unit at that side of the piston 1016 which faces away from the wall 1004.

The reference character 1062 denotes a cooling chamber which extends radially inwardly beyond the friction surfaces 1014, 1015 and, in the embodiment of FIG. 35, is defined by the wall 1004 and a sheet metal shroud 1063 which is sealingly secured (such as welded) to the outer side 1061 of the wall 1004. The cooling chamber 1062 has a sealable opening 1064 for admission or evacuation of a coolant 1065 partly filling the chamber 1062 and having a density which varies in response to heating by friction heat developing when the parts 1004, 1016 of he bypass clutch 1013 are caused or permitted to slip relative to each other. Such change of phase causes the body of coolant 1065 to store energy and to be accelerated radially inwardly due to a reduction of density and the lesser action of centrifugal force whenever the housing wall 1004 and the piston 1016 turn relative to each other. This enables the coolant 1065 to exchange heat with relatively cool (cooler) housing wall portions 1004*h* and shroud portions 1063*a*. Such cooling of the coolant 1065 entails a rise of density and an increased action of centrifugal force, i.e., the coolant flows radially outwardly and removes heat from the surface 1061 of the wall 1004 which is heated due to slippage relative to the piston 1016.

The coolant 1065 in the chamber 1062 can be water, ammonia, sulfur hexafluoride, one of Freon substitutes and others with a phase change between liquid and gaseous. It is also possible to employ solid substances, such as sodium, which can undergo a pronounced phase change between gaseous and solid in response to temperature changes.

In order to ensure the establishment of optimum relationship between the phase changes and the development of friction heat while the bypass clutch 1013 operates with slip, the chamber 1062 can be maintained at subatmospheric or superatmospheric pressure.

The cooling unit 1060 can be utilized with particular advantage in torque converters which employ conical bypass clutches because this renders it possible to install the cooling chamber 1062 in the conical regions at the friction surfaces of such bypass clutches. This can result in a substantial reduction of the space requirements (especially as seen in the axial direction) of torque converters embodying cooling units of the type shown in FIG. 35.

The features of the numerous embodiments shown in FIGS. 1 to 35 can be utilized interchangeably and/or cumulatively without departing from the spirit and scope of the invention. Furthermore, the novel fluid flow regulating arrangements, bypass clutches, cooling units, fluid circulating pumps, friction linings and other constituents stintuents afore described torque converters can be utilized, with equal or similar advantage, in many other types of torque converters for use in the power trains of motor vehicles or elsewhere.

Numerous modes of assembling and operating the improved torque converter and/or its bypass clutch and/or the regulating means therefore are disclosed on pages 31 to 60 in the aforementioned commonly owned copending German patent application Ser. No. 100 20 907.6 filed Apr. 28, 2000. It is emphasized, again, that the German priority application, including the pages 31 to 60 thereof, is incorporated herein by reference, i.e., that it forms part of the present application.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of hydrokinetic torque converters and, therefore, such adaptations should and are intended to be comprehended within the meaning and range of equivalence of the appended claims.

What is claimed is:

1. A hydrokinetic torque converter, comprising: a housing rotatable about a predetermined axis; a friction lining associated with said housing and shaped as a ring bounded by an inner circular border and an outer circular border; a pump rotatable by said housing about said axis; a turbine rotatable in said housing about said axis by and relative to said pump; means for rotating said housing; an output element rotatable about said axis and arranged to receive torque from said turbine, said clutch including a first part rotatable with said housing, a second part rotatable with said output element, and friction generating means operable to transmit torque between said parts with or without slip with attendant generation of friction heat during operation with slip; first and second plenum chambers containing bodies of hydraulic fluid at variable pressure with the provision for fluid flow between said chambers past said friction generating means, wherein said housing includes a cooling surface which engages said clutch and includes radially directed grooves configured in the manner of rays which originate from an inner circle radially inside said inner circular border and which terminate at an outer circle radially outside said outer circular border.

2. The torque converter of claim 1, further comprising torsional vibration damping means operating between said first part and at least one of said second part, said turbine and said output element.

3. The torque converter of claim 1, further comprising a stator provided in said housing intermediate said pump and said turbine.

4. The torque converter, of claim 1, wherein said radially directed grooves into said surface.

5. The torque converter, of claim 4, further comprising torsional vibration damping means operating between said first part and at least one of said second part, said turbine and said output element.

6. The torque converter of claim 4, further comprising a stator provided in said housing intermediate said pump and said turbine.

7. A method of cooling an engageable and disengageable bypass clutch which is installed in the rotary housing of a hydrokinetic torque converter and has coaxial rotary driving and driven components which frictionally engage each other when the clutch is at least partly engaged, such partial engagement involving a slip of said components relative to each other, comprising the steps of: providing in the housing first and second plenum chambers and maintaining therein bodies of hydraulic fluid arranged to at least partly engage the clutch in response to the establishment of a pressure differential between said bodies; establishing at least one path for the flow of fluid between said chambers by way of the clutch, at least in the partly engaged condition of the clutch; and regulating the flow of fluid along the at least one path in dependency upon the extent of slip between friction surfaces of said driving and driven components.

8. The method of claim 7, wherein said regulating step includes increasing the rate of fluid flow along the at least one path when the clutch operates with slip and reducing said rate of fluid flow when the clutch operates without slip.

* * * * *

UNITED STATES PATENT AND TRADEMARK OFFICE
CERTIFICATE OF CORRECTION

PATENT NO. : 6,851,532 B2
DATED : February 8, 2005
INVENTOR(S) : Paul Granderath et al.

It is certified that error appears in the above-identified patent and that said Letters Patent is hereby corrected as shown below:

<u>Title page,</u>
Item [73], Assignee, delete "LuK Lamellen und Kupplungsbau GmbH, Buhl/Baden (DE)" and substitute with -- LuK Lamellen und Kupplungsbau Beteiligungs KG, Buhl/Baden (DE) --.

Signed and Sealed this

Fifth Day of July, 2005

JON W. DUDAS
*Director of the United States Patent and Trademark Office*